(12) United States Patent
Koritala

(10) Patent No.: US 12,293,325 B2
(45) Date of Patent: May 6, 2025

(54) SYSTEM AND METHOD FOR FACILITATING DELIVERY OF ONE OR MORE PRODUCTS

(71) Applicant: Srirajasekhar Koritala, Naperville, IL (US)

(72) Inventor: Srirajasekhar Koritala, Naperville, IL (US)

(73) Assignee: Srirajasekhar Koritala, Naperville, IL (US)

( * ) Notice: Subject to any disclaimer, the term of this patent is extended or adjusted under 35 U.S.C. 154(b) by 632 days.

(21) Appl. No.: 17/487,368

(22) Filed: Sep. 28, 2021

(65) Prior Publication Data

US 2022/0012682 A1 Jan. 13, 2022

Related U.S. Application Data

(63) Continuation-in-part of application No. 16/658,125, filed on Oct. 20, 2019, now abandoned.

(51) Int. Cl.
G06Q 30/0601 (2023.01)
G01C 21/36 (2006.01)
(Continued)

(52) U.S. Cl.
CPC ..... G06Q 10/0834 (2013.01); G01C 21/3667 (2013.01); G06F 3/0482 (2013.01);
(Continued)

(58) Field of Classification Search
None
See application file for complete search history.

(56) References Cited

U.S. PATENT DOCUMENTS

2004/0034563 A1* 2/2004 Brissette ............... G07F 7/025
705/14.1
2013/0256403 A1* 10/2013 MacKinnon Keith ...................
G06Q 20/322
235/375

(Continued)

OTHER PUBLICATIONS

M. A. W. bin Nordzi, M. F. Mohd Hatta and A. R. Ahmad Dahlan, "GoBeli: Providing Runner Platform for Personal Shopper and Delivery Services for Urban Community," 2018 Int'l Conference on Information and CommTechnology for the Muslim World (ICT4M), Kuala Lumpur, Malaysia, 2018, pp. 202 (Year: 2018).*

*Primary Examiner* — Michelle T Kringen
(74) *Attorney, Agent, or Firm* — Jason C. Cameron

(57) ABSTRACT

A system and method for facilitating delivery of one or more products is disclosed. The method includes receiving a request from a purchaser to purchase one or more products from a desired store and receiving a mode of delivery of the one or more products from the purchaser. The method further includes determining the personal shopper for delivering the one or more products from the desired store to the purchaser based on the received request, received mode of delivery and predefined information by using a product delivery based AI model and obtaining an approval from the personal shopper for the received request of the purchaser. The method includes generating an order schedule and a dynamic navigation map for the personal shopper. Further, the method includes outputting the order schedule and the dynamic navigation map on a graphical user interface of one or more purchaser devices and personal shopper device.

18 Claims, 19 Drawing Sheets

(51) Int. Cl.
*G06F 3/0482* (2013.01)
*G06F 3/0484* (2022.01)
*G06Q 10/0631* (2023.01)
*G06Q 10/0834* (2023.01)
*G06Q 10/087* (2023.01)
*G06Q 30/0279* (2023.01)

(52) U.S. Cl.
CPC ... *G06F 3/0484* (2013.01); *G06Q 10/063118* (2013.01); *G06Q 10/087* (2013.01); *G06Q 30/0631* (2013.01); *G06Q 30/0637* (2013.01); *G06Q 30/0639* (2013.01); *G06Q 30/0641* (2013.01); *G06Q 30/0279* (2013.01)

(56) References Cited

U.S. PATENT DOCUMENTS

| | | | |
|---|---|---|---|
| 2015/0161564 A1* | 6/2015 | Sweeney | G06Q 10/08355 705/338 |
| 2017/0069013 A1* | 3/2017 | Castillo | G06Q 50/01 |
| 2020/0184535 A1* | 6/2020 | Barkan | G06F 16/252 |
| 2020/0286161 A1* | 9/2020 | Marguello | G06Q 30/0639 |

* cited by examiner

< Back    List of Stores    Filter

Gateway Demo Store

★★★★★

STORE PRICE: $ 140.00
IN STOCK: 26

Ymart Store

★★★★★

STORE PRICE: $ 160.00
IN STOCK: 12

Home    Account

FIG. 4D

< Back     Payment Summary

ORDER DETAILS:

Slim Fit casual shirt
Quantity: 1
Price: $ 140.00

| | |
|---|---|
| Sub Total | $ 140.00 |
| +Tax | $ 10.70 |
| Total Price: | $ 150.70 |

Delivery Details

Pickup

Grand Total
$ 150.70

Continue

Home      Account

< Back

Order Id: cdsCMy8Y7rosGo6K690Z

The QR code will be visible after accepting the order request

Slim Fit Casual Shirt  Quantity: 1

Store Location:
GATEWAY DISTRICT DEMO STORE 251
3rd Ave S
Minneapolis, Minnesota
United States, 55415

Shopper Location:
Stella Zoe
50 Oakland Ave, #206
A City, Florida
United States
53002
Contact Number: +1 (202) 555-0987

Date of Delivery:
Aug 16, 2016, at 9:50:00 AM
Estimated Earning: $13.80

[ Map ]  [ Reject ]  [ Accept ]

FIG. 6A

< Back

Order Id: cdsCMy8Y7rosGo6K690Z

Rate the store to finish accepting the order and reveal the QR code

Rate the Store

Slim Fit Casual Shirt                    Quantity: 1

Store Location:
GATEWAY DISTRICT DEMO STORE 251
3rd Ave S
Minneapolis, Minnesota
United States, 55415

Shopper Location:
Stella Zoe
50 Oakland Ave, #206
A City, Florida
United States
53002
Contact Number: +1 (202) 555-0987

Date of Delivery:
Aug 16, 2016, at 9:50:00 AM
Estimated Earning: $13.80

Map

FIG. 6B

SYSTEM AND METHOD FOR FACILITATING DELIVERY OF ONE OR MORE PRODUCTS

CROSS-REFERENCE TO RELATED APPLICATIONS

This application is a continuation in part of a non-provisional patent application filed in the US having patent application Ser. No. 16/658,125 filed on Oct. 20, 2019 and titled "GEOLOCATION SPECIFIED INTEGRATED SHOPPER, STORE AND PERSONAL SHOPPER DELIVERY SHOPPING ECOSYSTEM".

FIELD OF INVENTION

Embodiments of the present disclosure relate to an online shopping system and more particularly relates to a system and a method for facilitating delivery of one or more products.

BACKGROUND

With the advancements in technology, electronic commerce (e-commerce) websites are increasingly used for the purpose of purchasing one or more products, such as groceries, clothing products and the like. There are multiple advantages of using e-commerce websites over traditional shopping, such as fast buying process and wide variety of clothing products. Conventionally, e-commerce websites allow a purchaser to compare price of the one or more products at different stores, choose delivery date and time and the like. However, the conventional e-commerce websites do not provide a common platform to bring stores, purchasers, and personal shoppers in a geographically specific location. The personal shopper is a person who shops on behalf of the purchaser. Further, the conventional e-commerce websites also fail to determine best suitable personal shopper for the purchaser. Thus, the conventional e-commerce websites fail to provide a personalized shopping experience to the purchaser. Furthermore, the conventional e-commerce websites is expensive and consumes plenty of time to deliver the one or more products to the purchaser.

Hence, there is a need for a system and method for facilitating delivery of one or more products in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for facilitating delivery of one or more products is disclosed. The computing system includes one or more hardware processors and a memory coupled to the one or more hardware processors. The memory includes a plurality of modules in the form of programmable instructions executable by the one or more hardware processors. The plurality of modules include a data receiver module configured to receive a request from a purchaser to purchase one or more products from a desired store. The request includes: types of the one or more products, quantity of the one or more products and a purchaser address. The data receiver module is also configured to receive a mode of delivery of the one or more products from the purchaser. The mode of delivery includes: pick-up, shipping at the desired store and a personal shopper. The plurality of modules also include a delivery management module configured to determine the personal shopper for delivering the one or more products from the desired store to the purchaser based on the received request, received mode of delivery and predefined information by using a product delivery based Artificial Intelligence (AI) model upon receiving personal shopper as the model of delivery. The received request is forwarded to the determined personal shopper The plurality of modules further include a data obtaining module configured to obtain an approval from the personal shopper for the received request of the purchaser. Furthermore, the plurality of modules include a data generation module configured to generate an order schedule for the received request based on the received request, received mode of delivery and predefined order schedule by using a product delivery-based AI model upon obtaining the approval from the personal shopper. The order schedule includes purchaser address, desired store address information associated with the one or more products, estimated delivery time of the one or more products and order number. The data generation module is also configured to generate a dynamic navigation map for the personal shopper based on the received request upon generating the order schedule. The dynamic navigation map includes a path flow from a source address to a destination address. The source address is live location of the personal shopper and destination address is the purchaser address. Also, the plurality of modules include a data output module configured to output the generated order schedule and the generated dynamic navigation map on a graphical user interface of one or more purchaser devices associated with the purchaser and personal shopper device associated with the personal shopper.

In accordance with another embodiment of the present disclosure, a method for facilitating delivery of one or more products is disclosed. The method includes receiving a request from a purchaser to purchase one or more products from a desired store. The request includes: types of the one or more products, quantity of the one or more products and a purchaser address. The method also includes receiving a mode of delivery of the one or more products from the purchaser. The mode of delivery includes pick-up, shipping at the desired store and a personal shopper. The method further includes determining the personal shopper for delivering the one or more products from the desired store to the purchaser based on the received request, received mode of delivery and predefined information by using a product delivery based Artificial Intelligence (AI) model upon receiving personal shopper as the model of delivery. The received request is forwarded to the determined personal shopper Further, the method includes obtaining an approval from the personal shopper for the received request of the purchaser. Also, the method includes generating an order schedule for the received request based on the received request, received mode of delivery and predefined order schedule by using a product delivery-based AI model upon obtaining the approval from the personal shopper. The order schedule includes purchaser address, desired store address information associated with the one or more products, estimated delivery time of the one or more products and order number. The method further includes generating a dynamic navigation map for the personal shopper based on the received request upon generating the order schedule. The dynamic navigation map includes a path flow from a source address to a destination address. The source address is live location of the personal shopper and destination address is the purchaser address. Furthermore, the method includes outputting the generated order schedule and the generated dynamic navigation map on a graphical user interface of one or more purchaser devices associated with the purchaser and personal shopper device associated with the personal shopper.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIGS. 4A-L is a graphical user interface screen of a mobile application capable of facilitating delivery of the one or more products, in accordance with an embodiment of the present disclosure;

FIGS. 6A-C is a graphical user interface screen of a mobile application capable of facilitating delivery of the one or more products, in accordance with another embodiment of the present disclosure.

Figure 1:
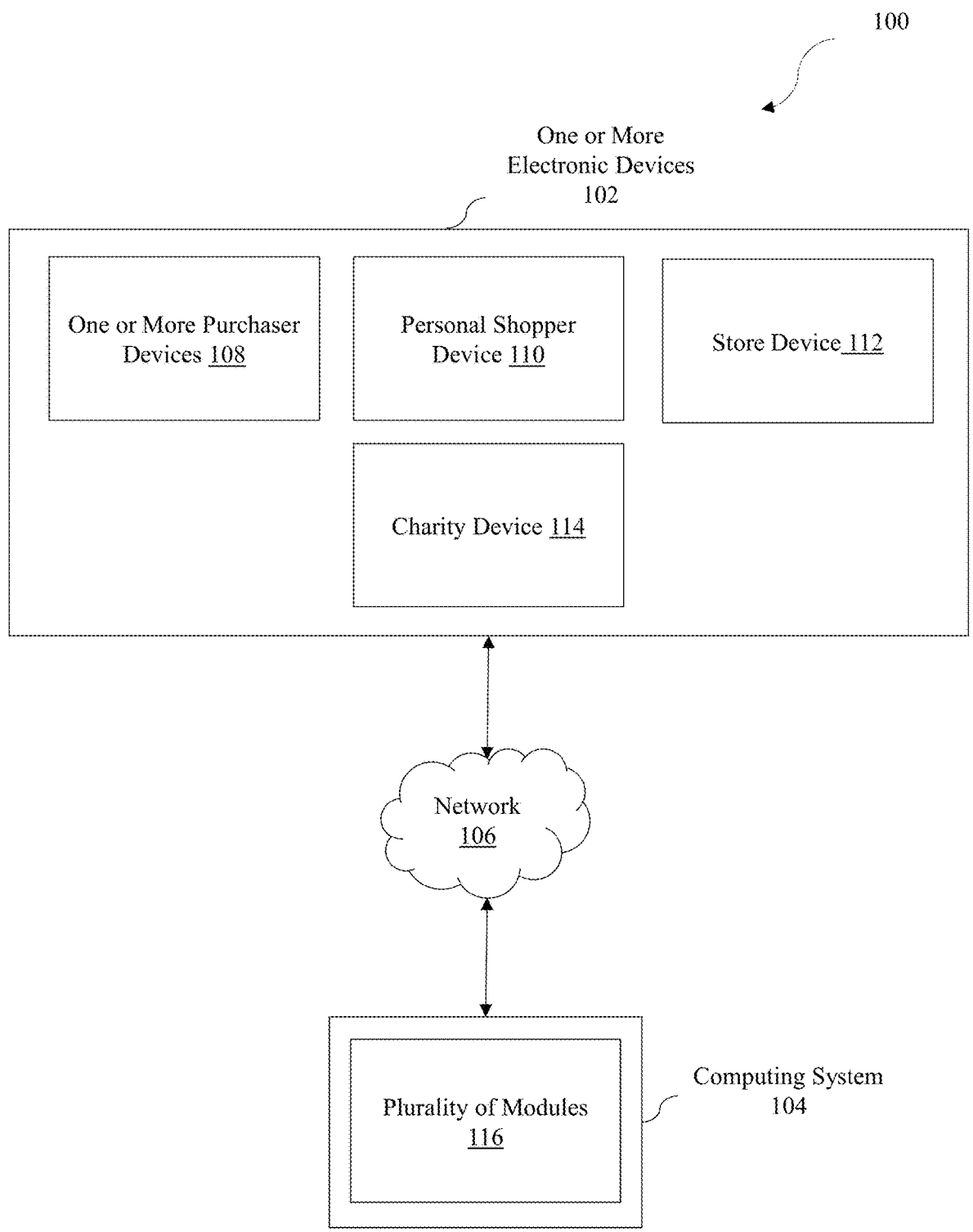
FIG. 1 is a block diagram illustrating an exemplary computing environment capable of facilitating delivery of one or more products, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 6C, where similar reference characters denote corresponding features consistently throughout the figures, there are shown preferred embodiments and these embodiments are described in the context of the following exemplary system and/or method.

FIG. 1 is a block diagram illustrating an exemplary computing environment 100 capable of facilitating delivery of one or more products, in accordance with an embodiment of the present disclosure. In an embodiment of the present disclosure, the one or more products are items offered for sale including grocery items, medicines, clothing products and the like. According to FIG. 1, the computing environment 100 includes one or more electronic devices 102 associated with one or more users communicatively coupled to a computing system 104 via a network 106. In an embodiment of the present disclosure, the one or more electronic devices 102 include one or more purchaser devices 108, a personal shopper device 110, a store device 112 and a charity device 114. In an exemplary embodiment of the present disclosure, the one or more users include a purchaser, a personal shopper, a desired store and a desired charity.

Further, the purchaser uses the one or more purchaser devices 108 to generate a request for purchasing one or more products from the desired store. In an exemplary embodiment of the present disclosure, the request includes types of the one or more products, quantity of the one or more products, a purchaser address and the like. The purchaser may also use the one or more purchaser devices 108 to receive order schedule, dynamic navigation map, one or more stores in proximity to the purchaser, and the like. The personal shopper uses the personal shopper device 110 to send an approval for the received request of the purchaser and to receive the order schedule, the dynamic navigation map, one or more recommendations and the like. Further, the desired store uses the store device 112 to receive updates regarding delivery of the one or more products. Further, the desired charity uses the charity device 114 to receive one or more analysis parameters. The computing system 104 may be a central server, such as cloud server or a remote server. In an exemplary embodiment of the present disclosure, the network 106 may be internet. In an exemplary embodiment of the present disclosure, the one or more electronic devices 102 may be a laptop computer, desktop computer, tablet computer, smartphone, wearable device, smart watch, virtual assistant device and the like.

Furthermore, the one or more electronic devices 102 include a web browser, an Artificial Intelligence (AI) chatbot and a mobile application to access the computing system 104 via the network 106. In an embodiment of the present disclosure, the one or more users may use a web application through the web browser to access the computing system 104. Further, the computing system 104 includes a plurality of modules 116. Details on the plurality of modules 116 have been elaborated in subsequent paragraphs of the present description with reference to FIG. 2.

In an embodiment of the present disclosure, the computing system 104 is configured to receive a request from the purchaser to purchase one or more products from the desired store. The computing system 104 also receive a mode of delivery of the one or more products from the purchaser. Further, the computing system 104 determines the personal shopper for delivering the one or more products from the desired store to the purchaser based on the received request, received mode of delivery and predefined information by using a product delivery based Artificial Intelligence (AI) model upon receiving personal shopper as the model of delivery. In an embodiment of the present disclosure, the received request is forwarded to the determined personal shopper. The computing system 104 obtains an approval from the personal shopper for the received request of the purchaser. Furthermore, the computing system 104 generates an order schedule for the received request based on the received request, received mode of delivery and predefined order schedule by using a product delivery-based AI model. The computing system 104 also generates a dynamic navigation map for the personal shopper based on the received request upon generating the order schedule. Further, the computing system 104 outputs the generated order schedule and the generated dynamic navigation map on a graphical user interface of one or more purchaser devices 108 associated with the purchaser and personal shopper device 110 associated with the personal shopper.

Figure 2:
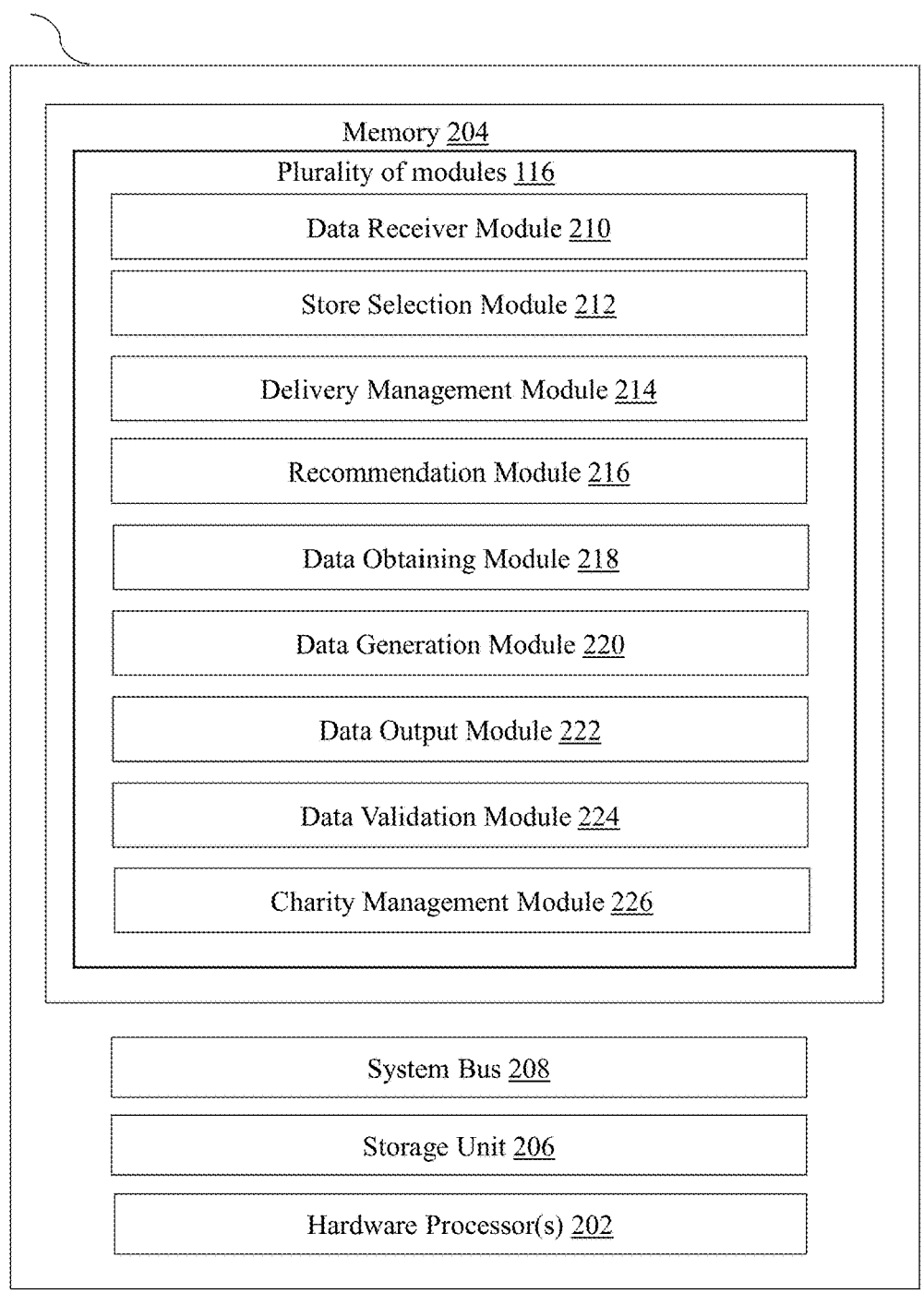
FIG. 2 is a block diagram illustrating an exemplary computing system, such as those shown in FIG. 1, capable of facilitating delivery of the one or more products, in accordance with an embodiment of the present disclosure.

FIG. 2 is a block diagram illustrating an exemplary computing system 104, such as those shown in FIG. 1, capable of facilitating delivery of one or more products. The computing system 104 comprises one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 116 in the form of programmable instructions executable by the one or more hardware processors 202. Further, the plurality of modules 116 includes a data receiver module 210, a store selection module 212, a delivery management module 214, a recommendation module 216, a data obtaining module 218, a data generation module 220, a data output module 222, a data validation module 224 and a charity management module 226.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 116 stored in the form of machine-readable instructions on any of the above-mentioned storage media and may be in communication with and executed by the one or more hardware processors 202.

The storage unit 206 may be a cloud storage. The storage unit 206 may store predefined information, predefined order schedule, order schedule and a dynamic navigation map. The storage unit 206 may also store prestored inventory details, one or more purchase parameters, security codes, prestored personal shopper details, prestored purchaser details and the like.

The data receiver module 210 is configured to receive a request from a purchaser to purchase one or more products from a desired store. In an embodiment of the present disclosure, the one or more products are items offered for sale including grocery items, medicines, clothing products and the like. Further, the request includes types of the one or more products, quantity of the one or more products, a purchaser address and the like. The desired store is in proximity to the purchaser address. In an embodiment of the present disclosure, the purchaser may view all available images of the one or more products in the form of slideshow without tapping on each tab for viewing the one or more products from various angles. The data receiver module 210 is also configured to receive a mode of delivery of the one or more products from the purchaser. The mode of delivery includes pick-up, shipping at the desired store and a personal shopper. In an embodiment of the present disclosure, the request is received from the purchaser via an Artificial Intelligence (AI) chatbot, a mobile application or a web browser.

In an embodiment of the present disclosure, before receiving a request from the purchaser to purchase the one or more products from the desired store, the desired store is selected by using the store selection module 212. The store selection module 212 is configured to detect one or more stores in proximity to the purchaser address having the one or more products based on the received request and prestored inventory details. In an embodiment of the present disclosure, the store selection module 212 correlates the received request and the prestored inventory details to detect the one or more stores. In an exemplary embodiment of the present disclosure, the prestored inventory details may include stock details of the one or more products in each of the one or more stores, price of the one or more products in each of the of the one or more stores and the like. Further, the store selection module 212 determine one or more purchase parameters associated with the one or more products corresponding to each of the detected one or more stores based on the received request, prestored inventory details and the predefined order schedule. In an embodiment of the present disclosure, the predefined order schedule include estimated time required to deliver each of the one or more products based on purchaser address and location of the one or more stores. The estimated time required to deliver each of the one or more products is dependent on multiple factors including quantity and type of each of the one or more products, weather and the like. The one or more purchase parameters include price of the one or more products, offers associated with the one or products, estimated delivery time of the one or more products, stock of the one or more products at each of the one or more stores, distance of each of the one or more stores from the purchaser address and the like. The offers associated with the one or products include discount, cashback, rewards and the like. In an embodiment of the present disclosure, the data output module 222 outputs the detected one or more stores along with the determined one or more purchase parameters on a graphical user interface of the one or more purchaser devices 108 associated with the purchaser. Furthermore, the store selection module 212 receives an input from the purchaser corresponding to the outputted one or more stores and the outputted one or more purchase parameters to select the desired store from the one more stores for purchasing the one or more products. For example, when the purchaser generates a request to purchase products including four milk bottles and three tea packs, the store selection module 212 detects two stores having the products. Further, the store selection module 212 determines that first store is charging more money for the products as compared to second store. Also, the store selection module 212 determines that the first store is taking more time to deliver the products as compared to the second store. Furthermore, the purchaser may provide an input to the store selection module 212 for selecting the second store as the desired store for purchasing the products.

Further, the purchaser may also request to purchase multiple products by using one or more shopping lists. The store selection module 212 is configured to receive one or more shopping inputs from the purchaser to create the one or more shopping lists. The one or more inputs include name of the one or more shopping lists, name of multiple products to be added in the one or more shopping lists, quantity of the multiple products, types of the multiple products and the like. The purchaser may search for products and add the products in the one or more shopping lists. Further, the purchaser may also add product names to the one or more shopping lists, delete products from the one or more shopping lists, rename shopping list, delete shopping list, move products from one shopping list to another, share the one or more shopping list with his/her friend via one or more means using the one or more purchaser devices 108, add personalized message while sharing the one or more shopping lists and the like. The one or means include email, text, and the like. In an embodiment of the present disclosure, the purchaser may request to purchase specific products from the one or more shopping lists. Further, the store selection module 212 detects one or more stores in proximity to the purchaser address having all of the multiple products or most of the multiple products based on the created one or more shopping lists and the prestored inventory details. The store selection module 212 determines the one or more purchase parameters associated with all of the multiple products or most of the multiple products corresponding to each of the detected one or more stores based on the one or more shopping lists, the prestored inventory details and the predefined order schedule. In an embodiment of the present disclosure, the data output module 222 outputs the detected one or more stores along with the determined one or more purchase parameters on the graphical user interface of the one or more purchaser devices 108 associated with the purchaser. The store selection module 212 receives an input from the purchaser corresponding to the outputted one or more stores and the outputted one or more purchase parameters to select the desired store from the one more stores for purchasing all of the multiple products or most of the multiple products.

Furthermore, the store selection module 212 detects one or more stores in proximity to the purchaser address having remaining products of the one or more shopping lists based on the created one or more shopping lists and the prestored inventory details upon detecting most of the multiple products. The store selection module 212 determines the one or more purchase parameters associated with the remaining products corresponding to each of the detected one or more stores based on the one or more shopping lists, the prestored inventory details and the predefined order schedule. In an embodiment of the present disclosure, the data output module 222 outputs the detected one or more stores along with the determined one or more purchase parameters on the graphical user interface of the one or more purchaser devices 108 associated with the purchaser. Furthermore, the store selection module 212 receives an input from the purchaser corresponding to the outputted one or more stores and the outputted one or more purchase parameters to select the desired store from the one more stores for purchasing the remaining products. In an embodiment of the present disclosure, the store selection module 212 keeps detecting the stores in proximity to the purchaser address until all stores having the multiple products are detected. When the multiple products are not available at a single desired store and rather available at multiple desired stores, a request is generated corresponding to each of the multiple desired stores for purchasing products that each desired store is having from the requested multiple products. For example, when the purchaser requests to purchase ten products and the store selection module 212 detects three stores having six products out of ten products, the purchaser provides an input to select one store from the three stores for purchasing the six products. Further, the store selection module 212 detects three stores for remaining four products. The purchaser provides an input to select one store from the three stores for purchasing the remaining four products. Since in the current scenario, the purchaser requests ten products from two stores, a request is generated corresponding to each of the two stores for purchasing the ten products. In an embodiment of the present disclosure, when a product from the ten products is unavailable at the stores, the store selection module 212 generates a notification for the purchaser to use a personal shopper for buying the unavailable product.

The delivery management module 214 is configured to determine the personal shopper for delivering the one or more products from the desired store to the purchaser based on the received request, received mode of delivery and predefined information by using a product delivery based Artificial Intelligence (AI) model upon receiving personal shopper as the model of delivery. In determining the personal shopper for delivering the one or more products from the desired store to the purchaser based on the received request, the received mode of delivery and the predefined information by using the product delivery based AI model upon receiving personal shopper as the model of delivery, the delivery management module 214 determines one or more personal shoppers for delivering the one or more products by correlating the received request, the received mode of delivery and the predefined information using the product delivery based AI model. In an exemplary embodiment of the present disclosure, the predefined information include one or more order parameters received from the purchaser, one or more delivery parameters received from the personal shopper and list of available personal shoppers. The one or more order parameters include past preferences, feedbacks, price range for the personal shopper, desired time of delivery, desired proximity range of the personal shopper from the desired store and the like. In an embodiment of the present disclosure, the purchaser may add the personal shoppers in a favorite list, such that he/she may directly select the personal shopper from the favorite list. The personal shoppers may also be added to the favorite list based on the past preferences of the purchaser. The one or more delivery parameters include rates of delivering products fixed by the personal shopper based on distance, weight, value of purchase, rating of the purchaser and purchaser address, delivery range of the personal shopper, time required to deliver the products, working hours of the personal shopper, stores for which the personal shopper is willing to deliver and the like. In an embodiment of the present disclosure, the delivery management module 214 determines the one or more personal shoppers present in a predefined radius around the purchaser. For example, the predefined radius may be 20 miles around the purchaser. In an embodiment of the present disclosure, the delivery management module 214 determines the one or more personal shoppers having the rate of delivery matching with the price range for the personal shopper. When the delivery management module 214 fails to determine the one or more personal shoppers having the rate of delivery matching with the price range for the personal shopper, the delivery management module 214 determines the one or more personal shoppers having the rate of delivery less than the price range for the personal shopper. In an embodiment of the present disclosure, when the delivery management module 214 fails to determine the one or more personal shoppers having the rate of delivery less than the price range for the personal shopper, the delivery management module 214 shares the request of the purchaser to all personal shoppers present in the predefined radius around the purchaser. When a personal shopper from all the personal shoppers accept the request, he/she may be authorized to deliver the one or more products to the purchaser. In an embodiment of the present disclosure, the personal shoppers may invite other personal shoppers via the personal shopper device 110s, such that the other personal shoppers download the mobile application to deliver the products for the purchasers.

In an embodiment of the present disclosure, the purchaser may purchase the one or more products directly from the store without using the mobile application. Further, the purchaser may request the desired personal shopper to deliver the one or more products purchased from the store. In an embodiment of the present disclosure, the desired store may be a store that has signed up by providing its product inventory for purchase, a store that has not signed up, e-commerce store and the like. The e-commerce store is e-commerce vendor who only sell online or through online shopping websites. The e-commerce store only sells in their local geographical location. The only mode of delivery for the e-commerce store is through personal shopper.

The recommendation module 216 is configured to generate one or more recommendations for the personal shopper corresponding to rate of delivery the one or more products based on the received request, received mode of delivery and predefined information by using the product delivery-based AI model. The data output module 222 outputs the generated one or more recommendations on the graphical user interface of the personal shopper device 110. In an embodiment of the present disclosure, the determined one or more personal shoppers are the personal shoppers who are available to deliver the one or more products. Furthermore, the delivery management module 214 receives an input from the purchaser corresponding to the outputted one or more personal shoppers to select best suitable personal shopper from the determined one or more personal shoppers for delivering the one or more products.

The data obtaining module 218 configured to obtain an approval from the personal shopper for the received request of the purchaser. In an embodiment of the present disclosure, when the data obtaining module 218 fails to obtain the approval from the personal shopper within a predefined time period, the delivery management module 214 may select next personal shopper among the determined one or more personal shopper to deliver the one or more products to the purchaser.

In an embodiment of the present disclosure, the request for purchasing the one or more requests may be prepaid or postpaid. The purchaser may request to buy the one or more products from the desired store, such that the desired personal shopper may pick-up the one or more products from the desired store and deliver the one or more products to the customer. The desired store is a store which has signed-up by providing information its product inventory. The product inventory is a list of all products available with the desired store. In prepaid request, the purchaser may also directly request a personal shopper to purchase the one or more products. Each personal shopper may list products that they may purchase for the purchaser. Further, personal shoppers may set price for the products listed in the inventory. When the personal shopper receives a request for purchasing the one or more products, the personal shopper first search the one or more products in signed-up stores. When the personal shopper finds the one or more products in the signed-up stores, the personal buys the one or more products from the signed-up stores and deliver the one or more products to the purchaser. When the signed-up stores are not having the one or more products, the delivery management module 214 provides the one or more products to the desired personal shopper for purchasing the one or more products on behalf of the purchaser. The desired personal shopper may search for the one or more products in stores which are not signed-up. In an embodiment of the present disclosure, the information associated with the non-signed up stores may be received from websites associated with such stores. The purchaser may provide one or more suggestions to the desired personal shopper via the one or more purchaser devices 108. The one or more suggestions are corresponding to the stores where the desired personal shoppers can get the one or more products. When the desired personal shopper finds the one or more products, the delivery management module 214 receives product information from the desired personal shopper. In an embodiment of the present disclosure, the desired personal shopper may provide the product information by using the personal shopper device 110 via the mobile application. In an exemplary embodiment of the present disclosure, the product information includes image of the product, price of the product, name of the product and the like. The delivery management module 214 provides the received product information to the purchaser and obtains a confirmation from the purchaser that the product information corresponds to the one or more products requested by the purchaser. In an embodiment of the present disclosure, when the confirmation is obtained and the purchaser pays for the one or more products, the delivery management module 214 sends a notification to the personal shopper device 110 to buy the one or more products and deliver the one or more products to the purchaser. When the desired personal shopper fails to find the one or more products, the purchaser is notified that the one or more products could not be found. When total price of the one or more products is more than the price that the buyer has paid, personal shopper cancels the request of the purchaser and money is returned to the buyer. Further, when total price of the one or more products is less than the price that the buyer has paid, personal shopper buys the one or more products. Further, the difference between the money paid by the purchaser and actual product charges may be returned to the purchaser. When total price of the one or more products is equal to price that the buyer has paid, personal shopper buys the one or more products. In an embodiment of the present disclosure, when the purchaser purchase from the signed-up stores and when the personal shopper picks up the one or more products from the signed-up stores, the signed-up stores get paid from a temporary account holding the money. Further, when the personal shopper delivers the one or more products to the purchaser, the personal shopper gets paid from the temporary account. For example, when the price of the one or more products is $70 and delivery charge is $20, the purchaser pays $90, such that $90 is loaded into the temporary account. The signed-up stores get paid $70 from the temporary account holding the money. Further, when the personal shopper delivers the one or more products to the purchaser, the personal shopper gets paid 10$ from the temporary account holding the money. In an embodiment of the present disclosure, while purchasing the one or more products on behalf of the purchaser, the personal shopper may interact with the purchaser via the personal shopper device 110 to obtain non-specific product information, specific product information and specific store information. In an exemplary embodiment of the present disclosure, the personal shopper may interact with the purchaser via the mobile application, phone call and the like. For example, when the purchaser requests the personal shopper to buy a mobile phone, the personal shopper may interact with the purchaser to obtain the non-specific product information, such as which model of the mobile phone. Further, the personal shopper may interact with the purchaser to obtain the specific product information, such as which color of the mobile phone. Furthermore, the personal shopper may interact with the purchaser to obtain the specific store information, such as from which store the mobile phone need to be purchased.

In an embodiment of the present disclosure, when the personal shopper refuses to deliver the one or more products or when no personal shopper is available to deliver the one or more products, market makers may deliver the one or more products to the purchaser. The market makers are personnel authorized to deliver the one or more products to the purchaser upon obtaining a refusal from the personal shopper for the received request of the purchaser or unavailability of personal shoppers. In an embodiment of the present disclosure, each market maker is assigned to a particular territory. For example, a market maker may be assigned for every 50 square miles. The delivery management module 214 determines one or more market makers for delivering the one or more products from the desired store to the purchaser based on the received request, the received mode of delivery and the predefined information by using the product delivery-based AI model upon obtaining a refusal from the personal shopper for the received request of the purchaser or unavailability of personal shoppers. In an embodiment of the present disclosure, the predefined information corresponding to the market maker include one or more order parameters received from the purchaser, one or more market parameters received from market maker and list of available market makers. In an exemplary embodiment of the present disclosure, the one or more market parameters include rates of delivering products fixed by the market maker, delivery range of the market maker, time required to deliver the products, stores for which the market maker is willing to deliver and the like. The data output module 222 outputs the determined one or more market makers on the graphical user interface of the one or more purchaser devices 108 associated with the purchaser. Further, the delivery management module 214 receives an input from the purchaser corresponding to the outputted one or more market makers to select best suitable market maker from the determined one or more market makers for delivering the one or more products. In an embodiment of the present disclosure, each of the market maker may access list of all orders by using a market maker device. The market makers are having an option to accept or refuse delivery of the one or more products. In an embodiment of the present disclosure, the market makers are required to mention a reason to refuse delivery of the one or more products.

The data generation module 220 is configured to generate an order schedule for the received request based on the received request, received mode of delivery and predefined order schedule by using a product delivery-based AI model upon obtaining the approval from the personal shopper. The order schedule includes purchaser address, desired store address information associated with the one or more products, estimated delivery time of the one or more products, order number and the like. In an exemplary embodiment of the present disclosure, the information associated with the one or more products includes types of the one or more products, quantity of the one or more products, weight of the one or more products and the like. Further, the data generation module 220 generates a dynamic navigation map for the personal shopper based on the received request upon generating the order schedule. The dynamic navigation map includes a path flow from a source address to a destination address. In an embodiment of the present disclosure, the source address is live location of the personal shopper and destination address is the purchaser address.

The data output module 222 outputs the generated order schedule and the generated dynamic map on the graphical user interface of the one or more purchaser devices 108 associated with the purchaser and the personal shopper device 110 associated with the personal shopper.

In an alternate embodiment of the present disclosure, the data validation module 224 generates a security code corresponding to the order schedule for both the purchaser and the personal shopper. Further, the data validation module 224 validates the security code for the personal shopper during picking-up the one or more products from the desired store based on prestored personal shopper details. In an embodiment of the present disclosure, the store device 112 may be used at the desired store to scan the security code associated with the personal shopper and validate the security code for the personal shopper based on the prestored personal shopper details. The data validation module 224 also validates the security code for the purchaser during delivering the one or more products at the purchaser address based on prestored purchaser details. In an embodiment of the present disclosure, the personal shopper device 110 may be used at the personal address to scan the security code associated with the purchaser and validate the security code for the purchaser based on the prestored purchaser details.

In an embodiment of the present disclosure, the data receiver module 210 is configured to receive a delivery confirmation message from the personal shopper upon delivery of the one or more products to the purchaser based on the generated dynamic navigation map, validation of the security code associated with the purchaser or a combination thereof.

The charity management module 226 is configured to receive charity information from the desired store, the purchaser or a combination thereof for making donations to a desired charity from one or more predefined charities. In an embodiment of the present disclosure, the one or more predefined charities are required to sign-up using the charity device 114, such that the desire store and the purchaser may provide charity information corresponding to the one or more predefined charities. In an embodiment of the present disclosure, while signing up, the one or more predefined charities are required to input a valid phone number or an email address. Further, the one or more predefined charities are required to provide the email address and create a password. The one or more predefined charities are also required to enter their charity name and a description on why are raising money. Furthermore, all the details provided by the one or more predefined charities are verified. The one or more predefined charities may provide a valid document for the verification of the provided details. The valid document is provided via email or uploading the document using the charity device 114. In an embodiment of the present disclosure, the charity management module 226 may scan the valid document by using a scanner associated with the charity device 114 and create a Portable Document File (pdf) of the scanned document. Further, the valid document in the pdf format may be reviewed and verified. The charity information include one or more purchaser parameters received from the purchaser and one or more store parameters received from the desired store. In an exemplary embodiment of the present disclosure, the one or more purchaser parameters include name of the charity, amount to be donated to charity and the like. In an exemplary embodiment of the present disclosure, the one or more store parameters include name of the desired charity, custom percentage of revenue to be donated, time-frame for donation and the like. In an embodiment of the present disclosure, the desired store may also select the desired charity for indefinite period of time rather than selecting the desired charity for a specific time-frame. The desired store may cancel the time-frame for donation at any time. In an embodiment of the present disclosure, the desired charity receives a notification via the charity device 114 stating that the desired store ended the time-frame for donation. All donations made before ending the time-frame for donation is provided to the desired charity. However, after ending the time-frame, the desired charity is removed from the desired store. In an embodiment of the present disclosure, a single charity may be selected by multiple stores for donation. Further, the charity management module 226 determines one or more analysis parameters for the desired charity based on the received charity information. In an exemplary embodiment of the present disclosure, the determined one or more analysis parameters include trends, demographics, the amount received from the purchaser and the desired store and the like. In an embodiment of the present disclosure, the determined one or more analysis parameters also include name of the purchaser and the desired store donating money. The data output module 222 outputs the determined one or more analysis parameters on the graphical user interface of the charity device 114 associated with the desired charity. The data output module 222 may output real time updates corresponding to the purchase resulting in donation to the desired charity. The desired charity may share their progress and revenues on their social media using the charity device 114. In an embodiment of the present disclosure, the one or more stores may nominate one or more charities by inputting the charity name and charity's contact information including email address and contact number. When the one or more charities are nominated, the one or more charities ae contacted to obtain acceptance corresponding to the nomination and accounts are set for the nominated one or more charities. Further, when the one or more stores select a charity from the one or more charities, the charity receives a notification that the charity is selected by the one or more stores.

In an embodiment of the present disclosure, when the purchaser searches for the one or more products and selects a store for purchasing the one or more products, the selected store states which charity the store is donating. The purchaser may also search for the desired charity by using charity name In an embodiment of the present disclosure, the purchaser may also select an option to round up bill of the one or more products to nearest dollar or donate an extra amount to the charity, such that the extra amount after rounding up or extra amount may directly be given to the desired charity. In an embodiment of the present disclosure, the desired store and the purchaser may vote the desired charity to increase reach of the desired charity. The desired store and the purchaser may vote for a predefined time period.

Over time the Samyata system accumulates data about several operations in the Samyata system. This data is then analyzed to provide various smart and predictive functions that benefit all users.

For example, a charity signs up to get selected by a store or purchaser for raising funds for the charity. Before signing up, the charity is required to download mobile application on the charity device 114 and open the downloaded mobile application. Further, the charity is prompted to either login or signup. Since, the charity is a new charity, it is required to sign-up. In signup page, the charity is prompted to enter an email address and a password. Further, the charity is required to verify the password. When the charity inputs all the required fields, the charity has to sign up by entering one or more details including charity name, contact information, such as email address, contact number, address and a brief description of the charity. Further, the charity is required to verify the charity by providing valid documents which may be scanned and uploaded, mailed, or dropped off. Furthermore, the charity may select "revenue" button to access revenue page having one or more charts depicting different trends including revenue over time and demographics. Also on the revenue page, there are two buttons named "shopper contributions" and "store contributions. When the charity clicks on the "shopper contributions" button, a leader board with all purchasers that have contributed to the charity are displayed. Further, the charity clicks on the "store contributions" button, a leader board with all stores that have contributed to the charity are displayed. In an embodiment of the present disclosure, the News Feed shows notifications from my contributors and the charity may track all the contributors contributing in real time. The charity may go back to the home screen and select "marketing/social media" button to connect social media handles to share posts corresponding to revenue, leader boards and other trends to thank the contributors and push more purchasers and stores to donate. Furthermore, the charity may go back to my homepage and invite staff to login into the mobile application. The charity may invite the staff through their personal email address and they can set up an account that is linked to the charity. On the home page, the charity may select an option to view my verification status and open my charity settings to update charity's information. The charity also receives an email saying that the charity has been verified. Further, the charity may receive notifications when any store and purchaser select the charity for donation. Furthermore, the charity may accept the selection and receive notifications corresponding to name and amount donated by the store and the purchaser. In the current scenario, when the store has selected three percentage of total revenue for donation, the charity receives three percentage of the store revenue. Further, when the purchaser desires to donate round off amount to the charity, the store rounds up the purchase to the nearest dollar and donates it to the charity. The charity also receives a notification in the news feed that a purchaser named "Joe" has just made a purchase from "Robi's Store for Cool People" and donated an additional 0.60 of his purchase and based on his purchase "Robi's Store for Cool People" donated $0.48.

For example, when a store desires to support a charity, the store may access the mobile application using the store device 112. The store may go to a home page and selects a "samyata gives" button. By selecting the samyata gives button, the store may either nominate a charity or select a charity. When the store decides to nominate a charity named: Good Charity, the store selects "nominate charity" button and provide information including name of the charity i.e. good charity, contact information including email address, contact number, and address, and a brief description of Good Charity. The brief description is optional. When the store selects submit button, information is sent for review and verification. Further, when the store selects a button "select a charity", the store may access a list of charities that have signed up and been approved. In the current scenario, the store selects a charity named "Robi's Charity for Veterans" from the list of charities. Furthermore, the store has to provide inputs to one or more questions including "select a percentage of revenue to go Robi's Charity for Veterans", "Would you like to round up a purchase to the nearest dollar?", and "Would you like to donate a designated amount?". In the current scenario, the percentage of revenue decided by the store is 3%, the store decides not to round up the purchase to the nearest dollar and the store decides to donate $100 to the charity as designated amount. Further, the store select "submit" button to confirm the provided inputs. Furthermore, a confirmation is sent to the charity and an acceptance is received from the charity for an offer to support the charity. When the confirmation is received from the charity, the donations are made as per the inputs. When the store decides to change the percentage of revenue to 5%, donate an additional amount of $100 to Robi's Charity for Veterans and to round up the amount, the store selects "Samyata gives" button access "manage selected charities" page. Further, the store selects Robi's Charity to access a page having "donate additional money" button and "change donation settings" button. The "donate additional money" button provides an option to donate a designated amount. The store uses the "donate additional money" button to type in $100 and click submit. Further, the store confirms the donation of $100 to donate it. Further, the store selects the "change donation settings" button to access a page for editing the percentage of revenue going to Robi's Charity and change the "Roundup" Feature. Further, the store changes the percentage of revenue to 5% and select "no" on the roundup feature. Furthermore, the store may confirm the changes and a notification is sent to the charity for stating the changes. Further, when the store decides to remove the charity, the store may select "manage selected charities" option and click "remove" to remove the charity.

For example, when a purchaser desires to support a charity, the purchaser may access the mobile application using the one or more purchaser devices 108. The purchaser may use a "Samyata Gives" button in profile settings to access a page having two buttons "nominate a charity" and "set default charity". When the purchaser selects "set default charity" button, a list of Charities that have signed up and been approved is shown to the purchaser. When the purchaser selects "Robi's Charity for Veterans", the purchaser is prompted with multiple options including select an option to round up my purchase to the nearest dollar, an option to donate a certain percentage of all purchases and an option to donate a designated amount of money. In the current scenario, the purchaser decides not to donate a designated amount. Further, the purchaser selects the option to round up bill to the nearest dollar option and decide to donate an additional 1% of purchase to "Robi's Charity for Veterans". The purchaser confirms the settings and go shopping for a t-shirt. Furthermore, the purchaser finds a red t-shirt for $9.50 and click on it to access item page. The store selling the t-shirt is "Robi's Store for Cool People". Further, the item page shows that the store is donating 5% of their proceeds to "Robi's Charity for Veterans". When the purchaser selects purchase button, a summary page is displayed to the purchaser showing total purchase amount. The subtotal for the t-shirt is $9.50. Since, the purchaser decided to donate an additional 1% of the purchase and round up to the nearest dollar, the summary page shows the added $0.50 and added $0.10, such that the subtotal for t-shirt is $10.10. The summary page also shows 5% of the revenue that is going to the charity under the total cost which is 0.48 i.e. rounded up from 47.5 cents. In an embodiment of the present disclosure, when the purchaser desires to nominate a charity, the purchaser uses the mobile application and go to my account. Further, the purchaser selects "Samyata Gives" and select "nominate charity" button and enter the name of the charity, the contact information, and an option to write a brief description of the charity. Furthermore, the purchaser selects submit button and waits for the charity to be approved. When the purchaser does not want to automatically donate to "Robi's Charity for Veterans", the purchaser accesses the Samyata gives page on the mobile application and turn off automatic donations. When the automatic donations are turned off and the purchaser searches for a product, the purchaser is prompted to select whether to donate to a charity. When the purchaser selects no, no donations are made to the charity. However, when the purchaser selects yes, the list of charities is displayed to the purchaser, such that the purchaser may select a charity from the list of charities. Further, when the purchaser selects a charity, the purchaser is prompted to input a percentage of the purchase, a designated amount, to round up to the nearest dollar, or any combination thereof.

Figure 3:
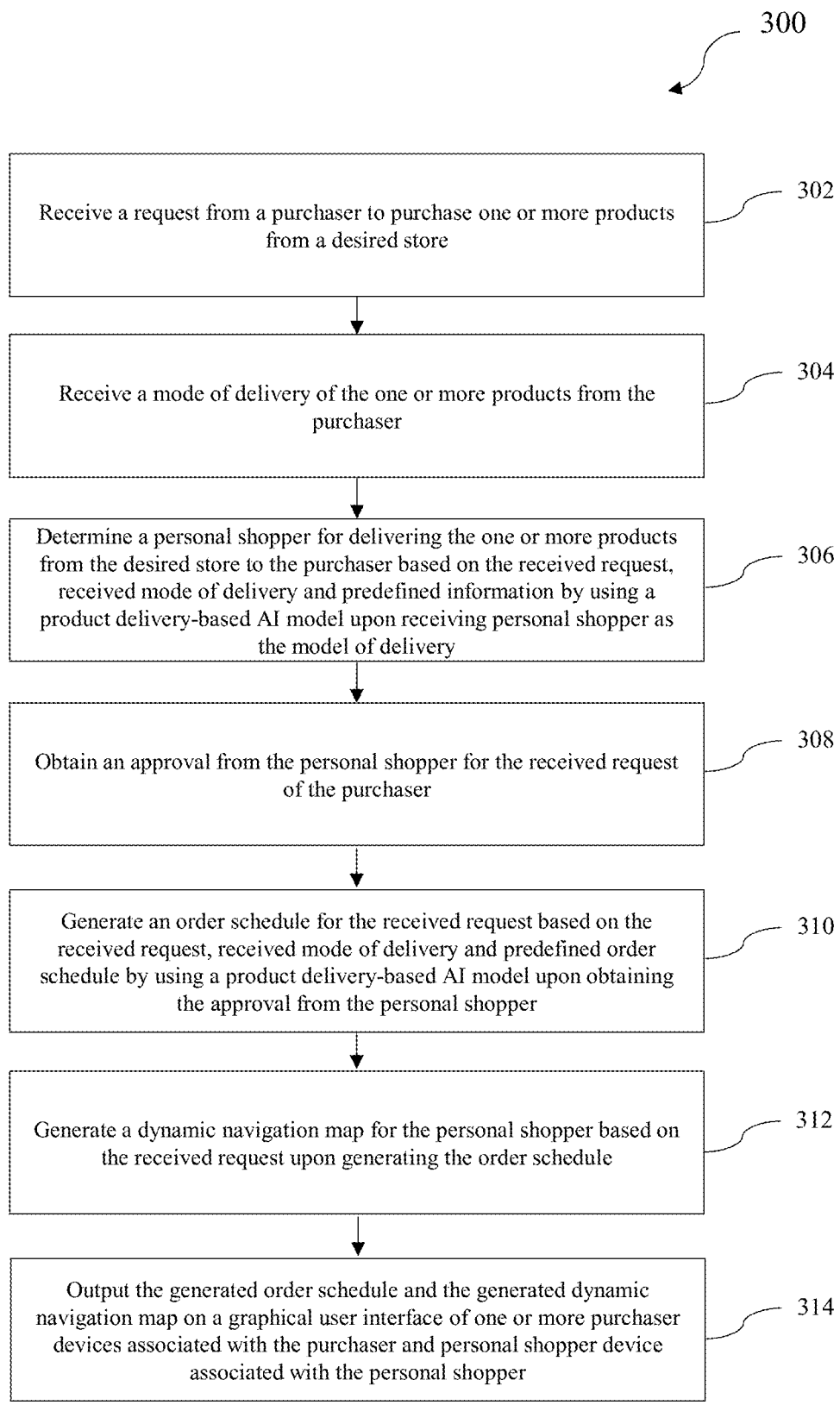
FIG. 3 is a process flow diagram illustrating an exemplary method for facilitating delivery of the one or more products, in accordance with an embodiment of the present disclosure.

FIG. 3 is a process flow diagram illustrating an exemplary method 300 for facilitating delivery of one or more products, in accordance with an embodiment of the present disclosure. At step 302, a request is received from a purchaser to purchase one or more products from a desired store. In an embodiment of the present disclosure, the one or more products are items offered for sale including grocery items, medicines, clothing products and the like. Further, the request includes types of the one or more products, quantity of the one or more products, a purchaser address and the like. The desired store is in proximity to the purchaser address. In an embodiment of the present disclosure, the purchaser may view all available images of the one or more products in the form of slideshow without tapping on each tab for viewing the one or more products from various angles.

At step 304, a mode of delivery of the one or more products is received from the purchaser. The mode of delivery includes pick-up, shipping at the desired store and a personal shopper. In an embodiment of the present disclosure, the request is received from the purchaser via an Artificial Intelligence (AI) chatbot, a mobile application or a web browser.

In an embodiment of the present disclosure, before receiving a request from the purchaser to purchase the one or more products from the desired store, the method 300 includes selecting the desired store. The method 300 includes detecting one or more stores in proximity to the purchaser address having the one or more products based on the received request and prestored inventory details. In an embodiment of the present disclosure, the method 300 includes correlating the received request and the prestored inventory details to detect the one or more stores. In an exemplary embodiment of the present disclosure, the prestored inventory details may include stock details of the one or more products in each of the one or more stores, price of the one or more products in each of the of the one or more stores and the like. Further, the method 300 includes determining one or more purchase parameters associated with the one or more products corresponding to each of the detected one or more stores based on the received request, prestored inventory details and the predefined order schedule. In an embodiment of the present disclosure, the predefined order schedule include estimated time required to deliver each of the one or more products based on purchaser address and location of the one or more stores. The estimated time required to deliver each of the one or more products is dependent on multiple factors including quantity and type of each of the one or more products, weather and the like. The one or more purchase parameters include price of the one or more products, offers associated with the one or products, estimated delivery time of the one or more products, stock of the one or more products at each of the one or more stores, distance of each of the one or more stores from the purchaser address and the like. The offers associated with the one or products include discount, cashback, rewards and the like. In an embodiment of the present disclosure, the method 300 includes outputting the detected one or more stores along with the determined one or more purchase parameters on a graphical user interface of the one or more purchaser devices 108 associated with the purchaser. Furthermore, the method 300 includes receiving an input from the purchaser corresponding to the outputted one or more stores and the outputted one or more purchase parameters to select the desired store from the one more stores for purchasing the one or more products. For example, when the purchaser generates a request to purchase products including four milk bottles and three tea packs, the method includes detecting two stores having the products. Further, the method 300 includes determining that first store is charging more money for the products as compared to second store. Also, the method 300 includes determining that the first store is taking more time to deliver the products as compared to the second store. Furthermore, the purchaser may provide an input for selecting the second store as the desired store for purchasing the products.

Further, the purchaser may also request to purchase multiple products by using one or more shopping lists. The method 300 includes receiving one or more shopping inputs from the purchaser to create the one or more shopping lists. The one or more inputs include name of the one or more shopping lists, name of multiple products to be added in the one or more shopping lists, quantity of the multiple products, types of the multiple products and the like. The purchaser may search for products and add the products in the one or more shopping lists. Further, the purchaser may also add product names to the one or more shopping lists, delete products from the one or more shopping lists, rename shopping list, delete shopping list, move products from one shopping list to another, share the one or more shopping list with his/her friend via one or more means using the one or more purchaser devices 108, add personalized message while sharing the one or more shopping lists and the like. The one or means include email, text, and the like. In an embodiment of the present disclosure, the purchaser may request to purchase specific products from the one or more shopping lists. Further, the method 300 includes detecting one or more stores in proximity to the purchaser address having all of the multiple products or most of the multiple products based on the created one or more shopping lists and the prestored inventory details. The method 300 includes determining the one or more purchase parameters associated with all of the multiple products or most of the multiple products corresponding to each of the detected one or more stores based on the one or more shopping lists, the prestored inventory details and the predefined order schedule. In an embodiment of the present disclosure, the method 300 includes outputting the detected one or more stores along with the determined one or more purchase parameters on the graphical user interface of the one or more purchaser devices 108 associated with the purchaser. The method 300 includes receiving an input from the purchaser corresponding to the outputted one or more stores and the outputted one or more purchase parameters to select the desired store from the one more stores for purchasing all of the multiple products or most of the multiple products.

Furthermore, the method 300 includes detecting one or more stores in proximity to the purchaser address having remaining products of the one or more shopping lists based on the created one or more shopping lists and the prestored inventory details upon detecting most of the multiple products. The method 300 includes determining the one or more purchase parameters associated with the remaining products corresponding to each of the detected one or more stores based on the one or more shopping lists, the prestored inventory details and the predefined order schedule. In an embodiment of the present disclosure, the method 300 includes outputting the detected one or more stores along with the determined one or more purchase parameters on the graphical user interface of the one or more purchaser devices 108 associated with the purchaser. Furthermore, the method 300 includes receiving an input from the purchaser corresponding to the outputted one or more stores and the outputted one or more purchase parameters to select the desired store from the one more stores for purchasing the remaining products. In an embodiment of the present disclosure, the method 300 includes detecting the stores in proximity to the purchaser address until all stores having the multiple products are detected. When the multiple products are not available at a single desired store and rather available at multiple desired stores, a request is generated corresponding to each of the multiple desired stores for purchasing products that each desired store is having from the requested multiple products.

At step 306, the personal shopper for delivering the one or more products from the desired store to the purchaser is determined based on the received request, received mode of delivery and predefined information by using a product delivery based Artificial Intelligence (AI) model upon receiving personal shopper as the model of delivery. In determining the personal shopper for delivering the one or more products from the desired store to the purchaser based on the received request, the received mode of delivery and the predefined information by using the product delivery based AI model upon receiving personal shopper as the model of delivery, the method 300 includes determining one or more personal shoppers for delivering the one or more products by correlating the received request, the received mode of delivery and the predefined information using the product delivery based AI model. In an exemplary embodiment of the present disclosure, the predefined information include one or more order parameters received from the purchaser, one or more delivery parameters received from the personal shopper and list of available personal shoppers. The one or more order parameters include past preferences, feedbacks, price range for the personal shopper, desired time of delivery, desired proximity range of the personal shopper from the desired store and the like. In an embodiment of the present disclosure, the purchaser may add the personal shoppers in a favorite list, such that he/she may directly select the personal shopper from the favorite list. The personal shoppers may also be added to the favorite list based on the past preferences of the purchaser. The one or more delivery parameters include rates of delivering products fixed by the personal shopper based on distance, weight, value of purchase, rating of the purchaser and purchaser address, delivery range of the personal shopper, time required to deliver the products, working hours of the personal shopper, stores for which the personal shopper is willing to deliver and the like. In an embodiment of the present disclosure, the method 300 includes determining the one or more personal shoppers present in a predefined radius around the purchaser. For example, the predefined radius may be 20 miles around the purchaser. In an embodiment of the present disclosure, the method 300 includes determining the one or more personal shoppers having the rate of delivery matching with the price range for the personal shopper. When the method 300 fails to determine the one or more personal shoppers having the rate of delivery matching with the price range for the personal shopper, the method 300 includes determining the one or more personal shoppers having the rate of delivery less than the price range for the personal shopper. In an embodiment of the present disclosure, when the method 300 fails to determine the one or more personal shoppers having the rate of delivery less than the price range for the personal shopper, the method 300 includes sharing the request of the purchaser to all personal shoppers present in the predefined radius around the purchaser. When a personal shopper from all the personal shoppers accept the request, he/she may be authorized to deliver the one or more products to the purchaser. In an embodiment of the present disclosure, the personal shoppers may invite other personal shoppers via the personal shopper device 110s, such that the other personal shoppers download the mobile application to deliver the products for the purchasers.

In an embodiment of the present disclosure, the purchaser may purchase the one or more products directly from the store without using the mobile application. Further, the purchaser may request the desired personal shopper to deliver the one or more products purchased from the store. In an embodiment of the present disclosure, the desired store may be a store that has signed up by providing its product inventory for purchase, a store that has not signed up, e-commerce store and the like. The e-commerce store is e-commerce vendor who only sell online or through online shopping websites. The e-commerce store only sells in their local geographical location. The only mode of delivery for the e-commerce store is through personal shopper.

The method 300 includes generating one or more recommendations for the personal shopper corresponding to rate of delivery the one or more products based on the received request, received mode of delivery and predefined information by using the product delivery-based AI model. The method 300 includes outputting the generated one or more recommendations on the graphical user interface of the personal shopper device 110. In an embodiment of the present disclosure, the determined one or more personal shoppers are the personal shoppers who are available to deliver the one or more products. Furthermore, the method 300 includes receiving an input from the purchaser corresponding to the outputted one or more personal shoppers to select best suitable personal shopper from the determined one or more personal shoppers for delivering the one or more products.

At step 308, an approval is obtained from the personal shopper for the received request of the purchaser. In an embodiment of the present disclosure, when the method 300 fails to obtain the approval from the personal shopper within a predefined time period, the method 300 includes selecting next personal shopper among the determined one or more personal shopper to deliver the one or more products to the purchaser.

In an embodiment of the present disclosure, the request for purchasing the one or more requests may be prepaid or postpaid. The purchaser may request to buy the one or more products from the desired store, such that the desired personal shopper may pick-up the one or more products from the desired store and deliver the one or more products to the customer. The desired store is a store which has signed-up by providing information its product inventory. The product inventory is a list of all products available with the desired store. In prepaid request, the purchaser may also directly request a personal shopper to purchase the one or more products. Each personal shopper may list products that they may purchase for the purchaser. Further, personal shoppers may set price for the products listed in the inventory. When the personal shopper receives a request for purchasing the one or more products, the personal shopper first search the one or more products in signed-up stores. When the personal shopper finds the one or more products in the signed-up stores, the personal buys the one or more products from the signed-up stores and deliver the one or more products to the purchaser. When the signed-up stores are not having the one or more products, the method 300 includes providing the one or more products to the desired personal shopper for purchasing the one or more products on behalf of the purchaser. The desired personal shopper may search for the one or more products in stores which are not signed-up. In an embodiment of the present disclosure, the information associated with the non-signed up stores may be received from websites associated with such stores. The purchaser may provide one or more suggestions to the desired personal shopper via the one or more purchaser devices 108. The one or more suggestions are corresponding to the stores where the desired personal shoppers can get the one or more products. When the desired personal shopper finds the one or more products, the method 300 includes receiving product information from the desired personal shopper. In an embodiment of the present disclosure, the desired personal shopper may provide the product information by using the personal shopper device 110 via the mobile application. In an exemplary embodiment of the present disclosure, the product information includes image of the product, price of the product, name of the product and the like. The method 300 includes providing the received product information to the purchaser and obtaining a confirmation from the purchaser that the product information corresponds to the one or more products requested by the purchaser. In an embodiment of the present disclosure, when the confirmation is obtained and the purchaser pays for the one or more products, the method 300 includes sending a notification to the personal shopper device 110 to buy the one or more products and deliver the one or more products to the purchaser. When the desired personal shopper fails to find the one or more products, the purchaser is notified that the one or more products could not be found. When total price of the one or more products is more than the price that the buyer has paid, personal shopper cancels the request of the purchaser and money is returned to the buyer. Further, when total price of the one or more products is less than the price that the buyer has paid, personal shopper buys the one or more products. Further, the difference between the money paid by the purchaser and actual product charges may be returned to the purchaser. When total price of the one or more products is equal to price that the buyer has paid, personal shopper buys the one or more products. In an embodiment of the present disclosure, when the purchaser purchase from the signed-up stores and when the personal shopper picks up the one or more products from the signed-up stores, the signed-up stores get paid from a temporary account holding the money. Further, when the personal shopper delivers the one or more products to the purchaser, the personal shopper gets paid from the temporary account. For example, when the price of the one or more products is $70 and delivery charge is $20, the purchaser pays $90, such that $90 is loaded into the temporary account. The signed-up stores get paid $70 from the temporary account holding the money. Further, when the personal shopper delivers the one or more products to the purchaser, the personal shopper gets paid 10$ from the temporary account holding the money. In an embodiment of the present disclosure, while purchasing the one or more products on behalf of the purchaser, the personal shopper may interact with the purchaser via the personal shopper device 110 to obtain non-specific product information, specific product information and specific store information. In an exemplary embodiment of the present disclosure, the personal shopper may interact with the purchaser via the mobile application, phone call and the like. For example, when the purchaser requests the personal shopper to buy a mobile phone, the personal shopper may interact with the purchaser to obtain the non-specific product information, such as which model of the mobile phone. Further, the personal shopper may interact with the purchaser to obtain the specific product information, such as which color of the mobile phone. Furthermore, the personal shopper may interact with the purchaser to obtain the specific store information, such as from which store the mobile phone need to be purchased.

In an embodiment of the present disclosure, when the personal shopper refuses to deliver the one or more products or when no personal shopper is available to deliver the one or more products, market makers may deliver the one or more products to the purchaser. The market makers are personnel authorized to deliver the one or more products to the purchaser upon obtaining a refusal from the personal shopper for the received request of the purchaser or unavailability of personal shoppers. In an embodiment of the present disclosure, each market maker is assigned to a particular territory. For example, a market maker may be assigned for every 50 square miles. The method 300 includes determining one or more market makers for delivering the one or more products from the desired store to the purchaser based on the received request, the received mode of delivery and the predefined information by using the product delivery-based AI model upon obtaining a refusal from the personal shopper for the received request of the purchaser or unavailability of personal shoppers. In an embodiment of the present disclosure, the predefined information corresponding to the market maker include one or more order parameters received from the purchaser, one or more market parameters received from market maker and list of available market makers. In an exemplary embodiment of the present disclosure, the one or more market parameters include rates of delivering products fixed by the market maker, delivery range of the market maker, time required to deliver the products, stores for which the market maker is willing to deliver and the like. The method 300 includes outputting the determined one or more market makers on the graphical user interface of the one or more purchaser devices 108 associated with the purchaser. Further, the method 300 includes receiving an input from the purchaser corresponding to the outputted one or more market makers to select best suitable market maker from the determined one or more market makers for delivering the one or more products. In an embodiment of the present disclosure, each of the market maker may access list of all orders by using a market maker device. The market makers are having an option to accept or refuse delivery of the one or more products. In an embodiment of the present disclosure, the market makers are required to mention a reason to refuse delivery of the one or more products.

At step 310, an order schedule is generated for the received request based on the received request, received mode of delivery and predefined order schedule by using a product delivery-based AI model upon obtaining the approval from the personal shopper. The order schedule includes purchaser address, desired store address information associated with the one or more products, estimated delivery time of the one or more products, order number and the like. In an exemplary embodiment of the present disclosure, the information associated with the one or more products includes types of the one or more products, quantity of the one or more products, weight of the one or more products and the like.

At step 312, a dynamic navigation map is generated for the personal shopper based on the received request upon generating the order schedule. The dynamic navigation map includes a path flow from a source address to a destination address. In an embodiment of the present disclosure, the source address is live location of the personal shopper and destination address is the purchaser address.

At step 314, the generated order schedule and the generated dynamic navigation map is outputted on the graphical user interface of one or more purchaser devices 108 associated with the purchaser and personal shopper device 110 associated with the personal shopper.

In an alternate embodiment of the present disclosure, the method 300 includes generating a security code corresponding to the order schedule for both the purchaser and the personal shopper. Further, the method 300 includes validating the security code for the personal shopper during picking-up the one or more products from the desired store based on prestored personal shopper details. In an embodiment of the present disclosure, the store device 112 may be used at the desired store to scan the security code associated with the personal shopper and validate the security code for the personal shopper based on the prestored personal shopper details. The method 300 includes validating the security code for the purchaser during delivering the one or more products at the purchaser address based on prestored purchaser details. In an embodiment of the present disclosure, the personal shopper device 110 may be used at the personal address to scan the security code associated with the purchaser and validate the security code for the purchaser based on the prestored purchaser details.

In an embodiment of the present disclosure, the method 300 includes receiving a delivery confirmation message from the personal shopper upon delivery of the one or more products to the purchaser based on the generated dynamic navigation map, validation of the security code associated with the purchaser or a combination thereof.

The method 300 includes receiving charity information from the desired store, the purchaser or a combination thereof for making donations to a desired charity from one or more predefined charities. In an embodiment of the present disclosure, the one or more predefined charities are required to sign-up using the charity device 114, such that the desire store and the purchaser may provide charity information corresponding to the one or more predefined charities. In an embodiment of the present disclosure, while signing up, the one or more predefined charities are required to input a valid phone number or an email address. Further, the one or more predefined charities are required to provide the email address and create a password. The one or more predefined charities are also required to enter their charity name and a description on why are raising money. Furthermore, all the details provided by the one or more predefined charities are verified. The one or more predefined charities may provide a valid document for the verification of the provided details. The valid document is provided via email or uploading the document using the charity device 114. In an embodiment of the present disclosure, the method 300 includes scanning the valid document by using a scanner associated with the charity device 114 and create a Portable Document File (pdf) of the scanned document. Further, the valid document in the pdf format may be reviewed and verified. The charity information include one or more purchaser parameters received from the purchaser and one or more store parameters received from the desired store. In an exemplary embodiment of the present disclosure, the one or more purchaser parameters include name of the charity, amount to be donated to charity and the like. In an exemplary embodiment of the present disclosure, the one or more store parameters include name of the desired charity, custom percentage of revenue to be donated, time-frame for donation and the like. In an embodiment of the present disclosure, the desired store may also select the desired charity for indefinite period of time rather than selecting the desired charity for a specific time-frame. The desired store may cancel the time-frame for donation at any time. In an embodiment of the present disclosure, the desired charity receives a notification via the charity device 114 stating that the desired store ended the time-frame for donation. All donations made before ending the time-frame for donation is provided to the desired charity. However, after ending the time-frame, the desired charity is removed from the desired store. In an embodiment of the present disclosure, a single charity may be selected by multiple stores for donation. Further, the method 300 includes determining one or more analysis parameters for the desired charity based on the received charity information. In an exemplary embodiment of the present disclosure, the determined one or more analysis parameters include trends, demographics, the amount received from the purchaser and the desired store and the like. In an embodiment of the present disclosure, the determined one or more analysis parameters also include name of the purchaser and the desired store donating money. The method 300 includes outputting the determined one or more analysis parameters on the graphical user interface of the charity device 114 associated with the desired charity. The desired charity may share their progress and revenues on their social media using the charity device 114. In an embodiment of the present disclosure, the one or more stores may nominate one or more charities by inputting the charity name and charity's contact information including email address and contact number. When the one or more charities are nominated, the one or more charities ae contacted to obtain acceptance corresponding to the nomination and accounts are set for the nominated one or more charities. Further, when the one or more stores select a charity from the one or more charities, the charity receives a notification that the charity is selected by the one or more stores.

In an embodiment of the present disclosure, when the purchaser searches for the one or more products and selects a store for purchasing the one or more products, the selected store states which charity the store is donating. The purchaser may also search for the desired charity by using charity name In an embodiment of the present disclosure, the purchaser may also select an option to round up bill of the one or more products to nearest dollar or donate an extra amount to the charity, such that the extra amount after rounding up or extra amount may directly be given to the desired charity. In an embodiment of the present disclosure, the desired store and the purchaser may vote the desired charity to increase reach of the desired charity. The desired store and the purchaser may vote for a predefined time period.

The method 300 may be implemented in any suitable hardware, software, firmware, or combination thereof.

FIGS. 4A-L is a graphical user interface screen of a mobile application capable of facilitating delivery of the one or more products, in accordance with an embodiment of the present disclosure. In an embodiment of the present disclosure, the mobile application is used by the purchaser. In an embodiment of the present disclosure, the purchaser is required to perform authentication before using the mobile application. The Authentication may be done via the one or more purchaser devices 108. In the current scenario, the one or more purchaser devices 108 is the mobile phone. Further, the purchaser may select his country code and then enter his ten digits mobile number with no spaces or special characters. Also, mobile phone should not be on the airplane mode. In an embodiment of the present disclosure, the mobile phone is required to have access to a cellular phone network 106 in order to receive an OTP through SMS. Furthermore, the purchaser is required to enter the received OTP and tap verify button. If the purchaser is a new user, the purchaser is required to set a password which can be used for logging into the mobile application. When the registration is successful, the purchaser may be taken to a homepage where the purchaser may search the one or more products via the manual search, the voice search and the barcode search to buy the one or more products. In manual search, the purchaser may search the one or more products by using a search string, such that all the relevant products matching the string may be displayed. Further, in barcode search, the purchaser may search for the one or more products by scanning the barcode. The products whose barcode ae stored in the storage unit 206 may appear in the search results. In voice search, the purchaser may input his/her voice for searching the one or more products.

Figure 4A:
Figure 4B:
Figure 4C:
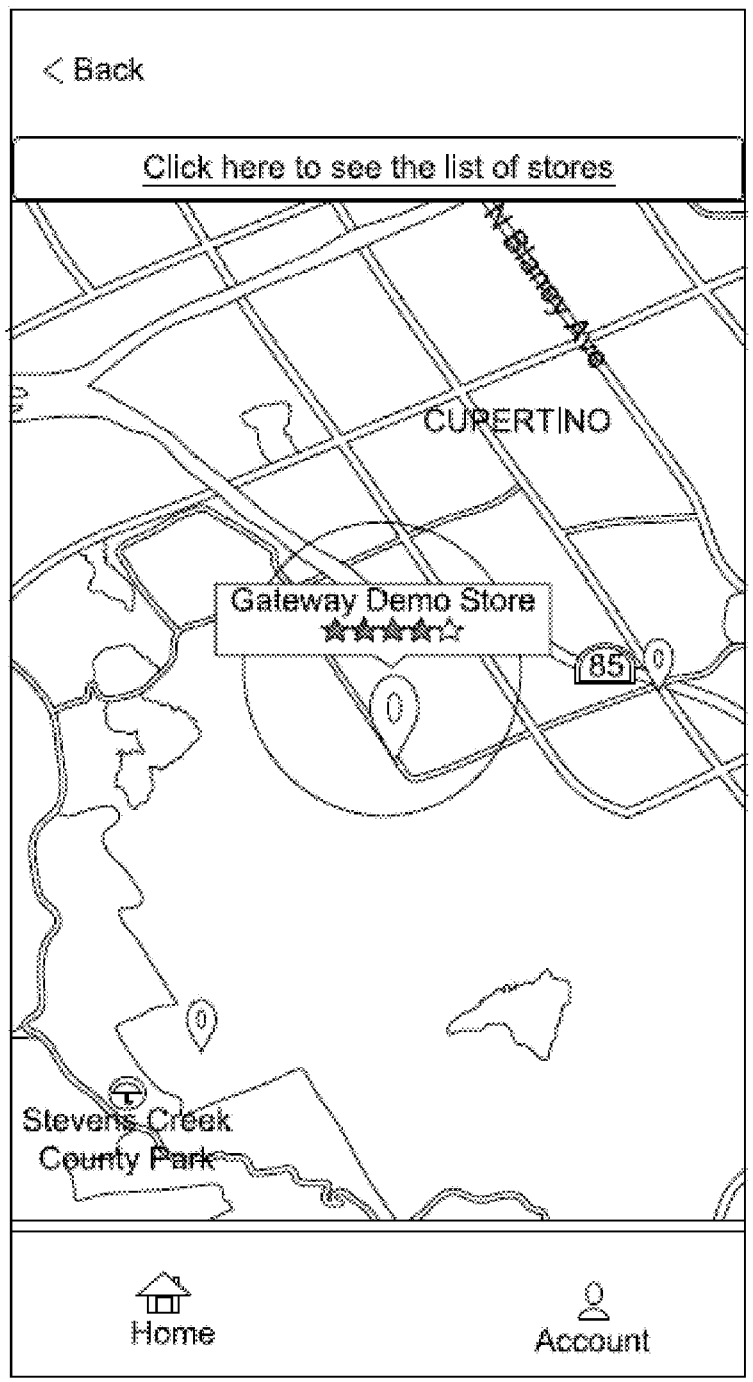

FIG. 4A is the graphical user interface screen of the mobile application for displaying the search results. FIG. 4B is the graphical user interface screen of the mobile application for depicting product details page which displays all details of a selected product from the one or more products. The purchaser may select quantity of the selected product from the product details page. Further, the purchaser may select buy it option to access a geolocation page. FIG. 4C is the graphical user interface screen of the mobile application for depicting the geolocation page. The purchaser may select the store by clicking on the store icon in map view or the purchaser may view all the stores carrying the one or more products by selecting the list of stores option, as shown in FIG. 4C.

Figure 4E:
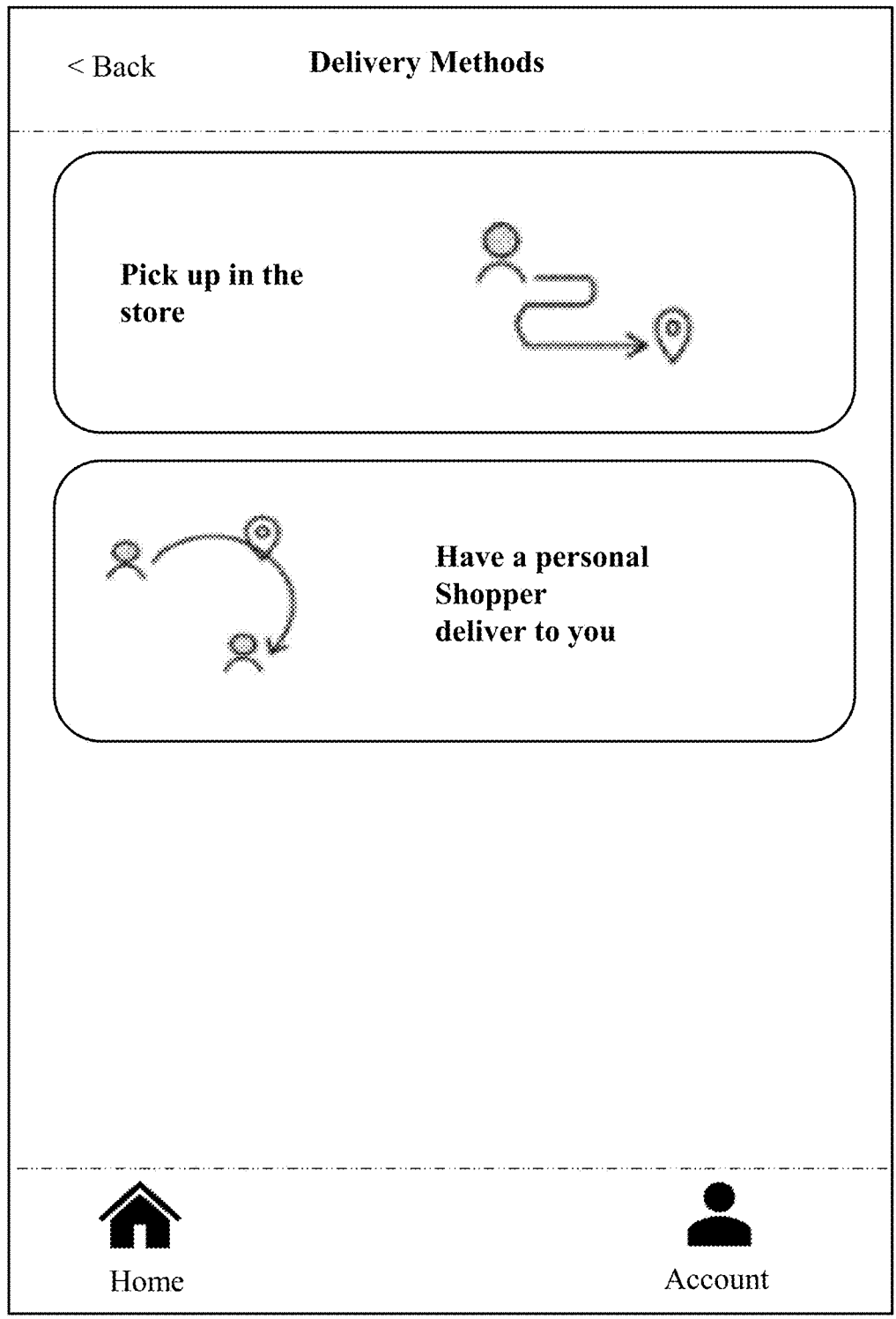

FIG. 4D is the graphical user interface screen of the mobile application for displaying all the stores carrying the one or more products and sorting of the stores is defaulted by price, distance and stock. The purchaser may always have an option to sort the stores by price or distance or stock. FIG. 4E is the graphical user interface screen of the mobile application depicting delivery methods screen. By using the delivery methods page the purchaser may select mode of deliver of the one or more products. In the current scenario, there are two modes of delivery i.e. pick up and personal shopper. FIG. 4F is the graphical user interface screen of the mobile application depicting payment summary page. By using the payment summary page, the purchaser may view total price, delivery details and grand total, as shown in FIG. 4F. In an embodiment of the present disclosure, the purchaser may select continue option to access payment page.

Figure 4G:
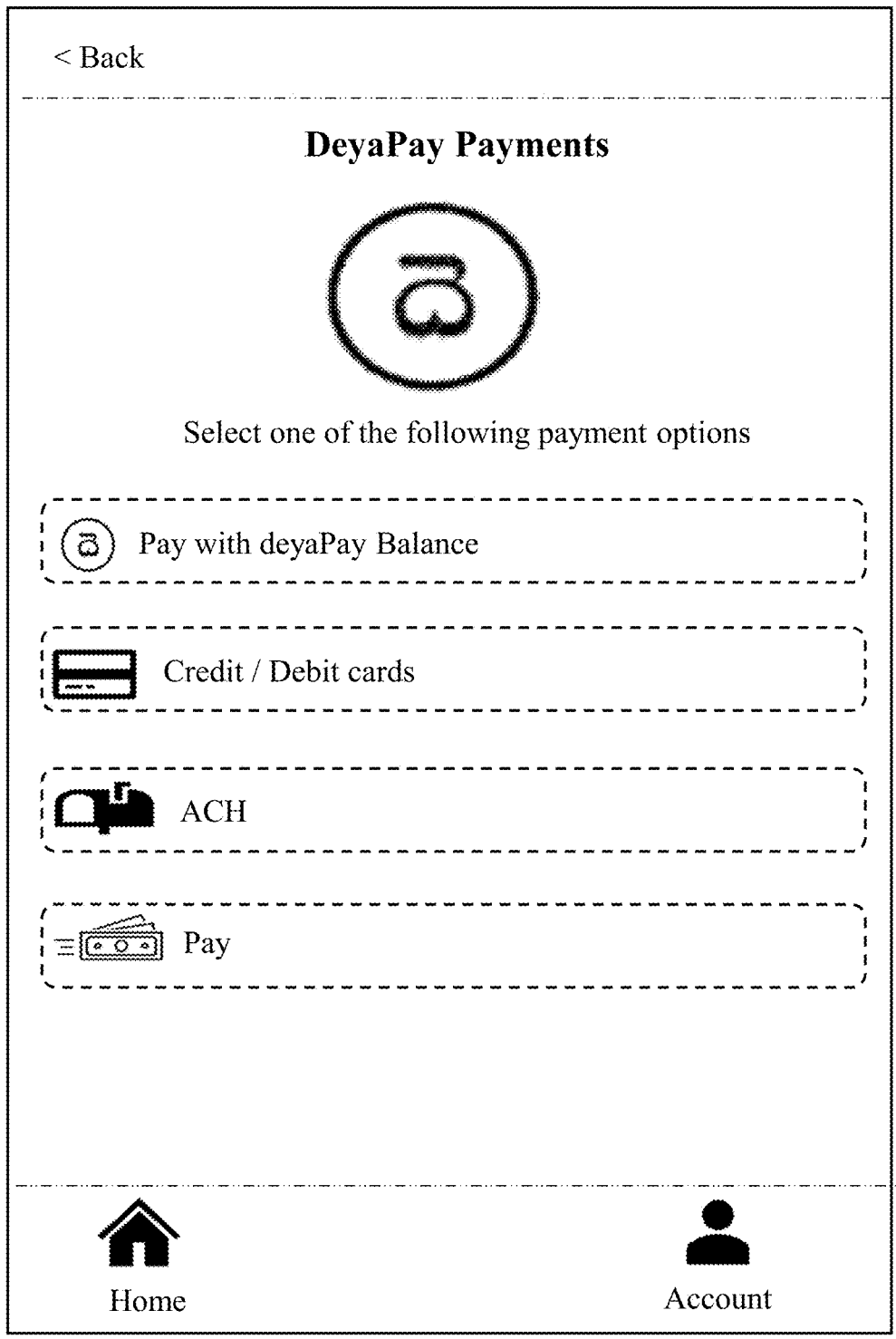
Figure 4H:
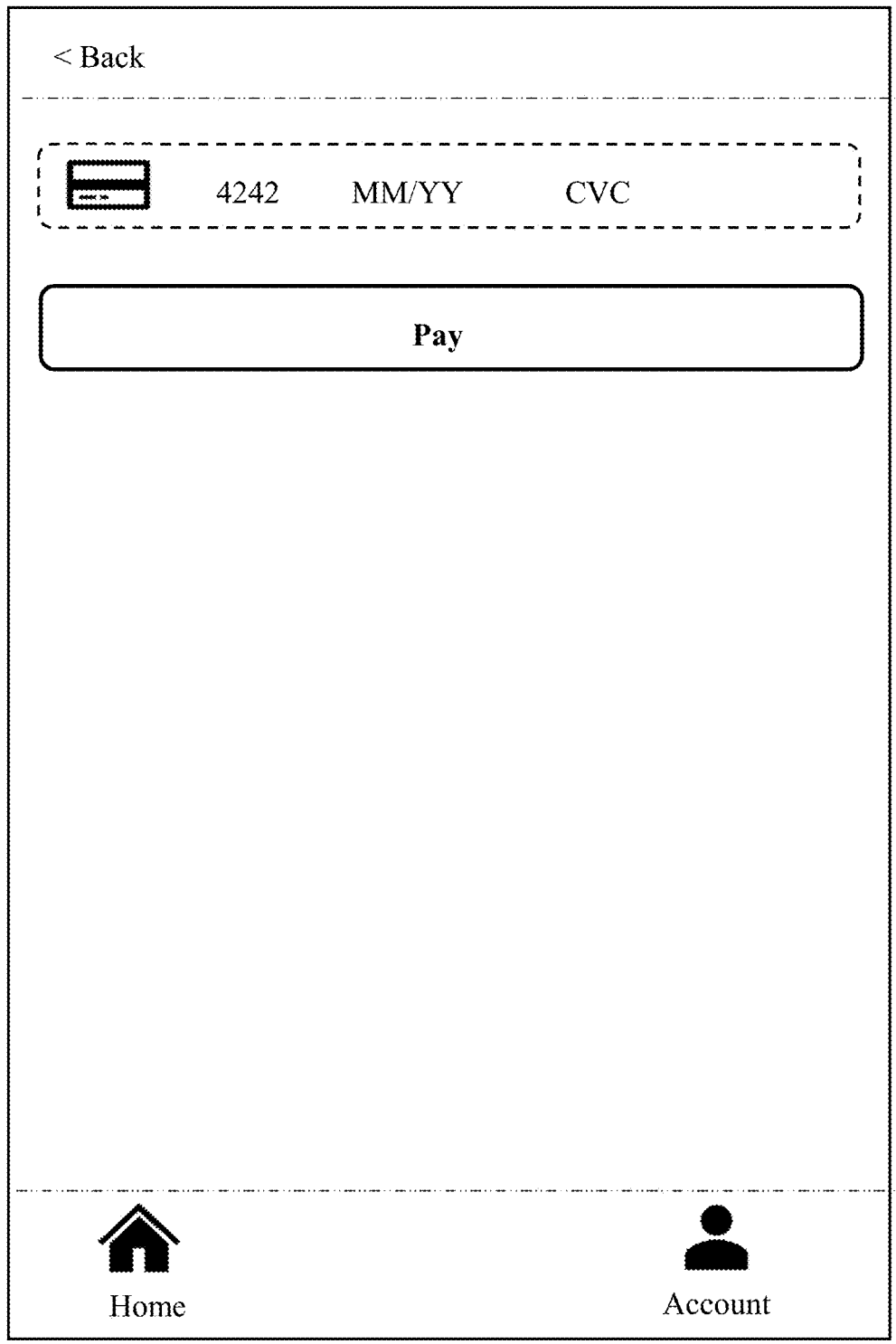
Figure 4I:
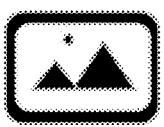
Figure 4J:
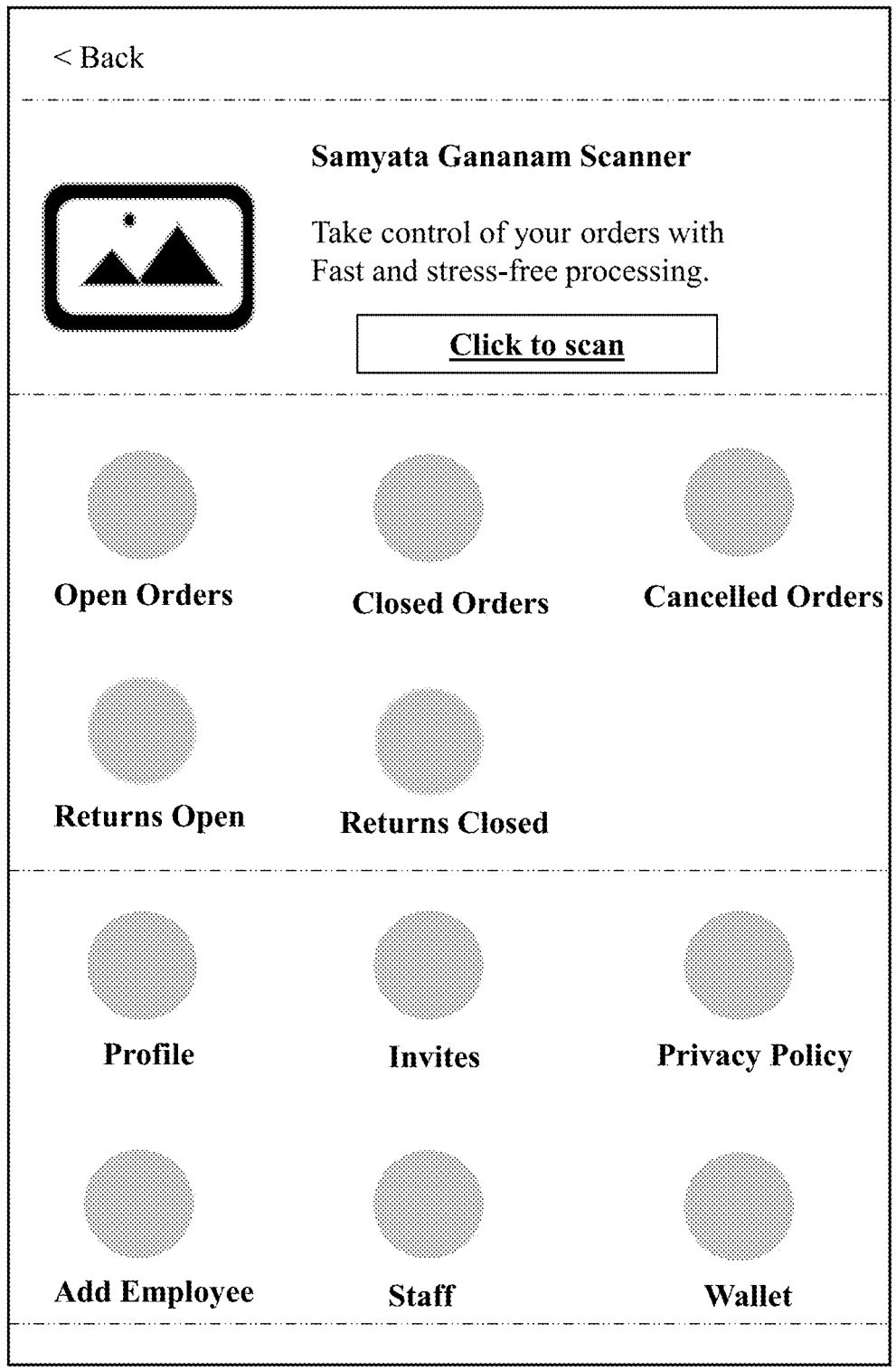

FIG. 4G is the graphical user interface screen of the mobile application depicting the payment page. By using the payment page, the purchaser may select any payment method to pay with debit/credit, proprietary Pay Balance, Apple Pay or ACH and can proceed with payment. Once payment is processed order corresponding to the request may be placed successfully. FIG. 4H is the graphical user interface screen of the mobile application showing saved payment cards. FIG. 4I is the graphical user interface screen of the mobile application showing order details, such as order ID, store address, product details and the like. Further, the purchaser rates the store using the mobile application to reveal the QR code. FIG. 4J is the graphical user interface screen of the mobile application for accessing open orders, closed orders, cancelled orders, profiles, wallet, and the like. Furthermore, the purchaser is notified that the order has been successfully delivered.

Figure 4K:
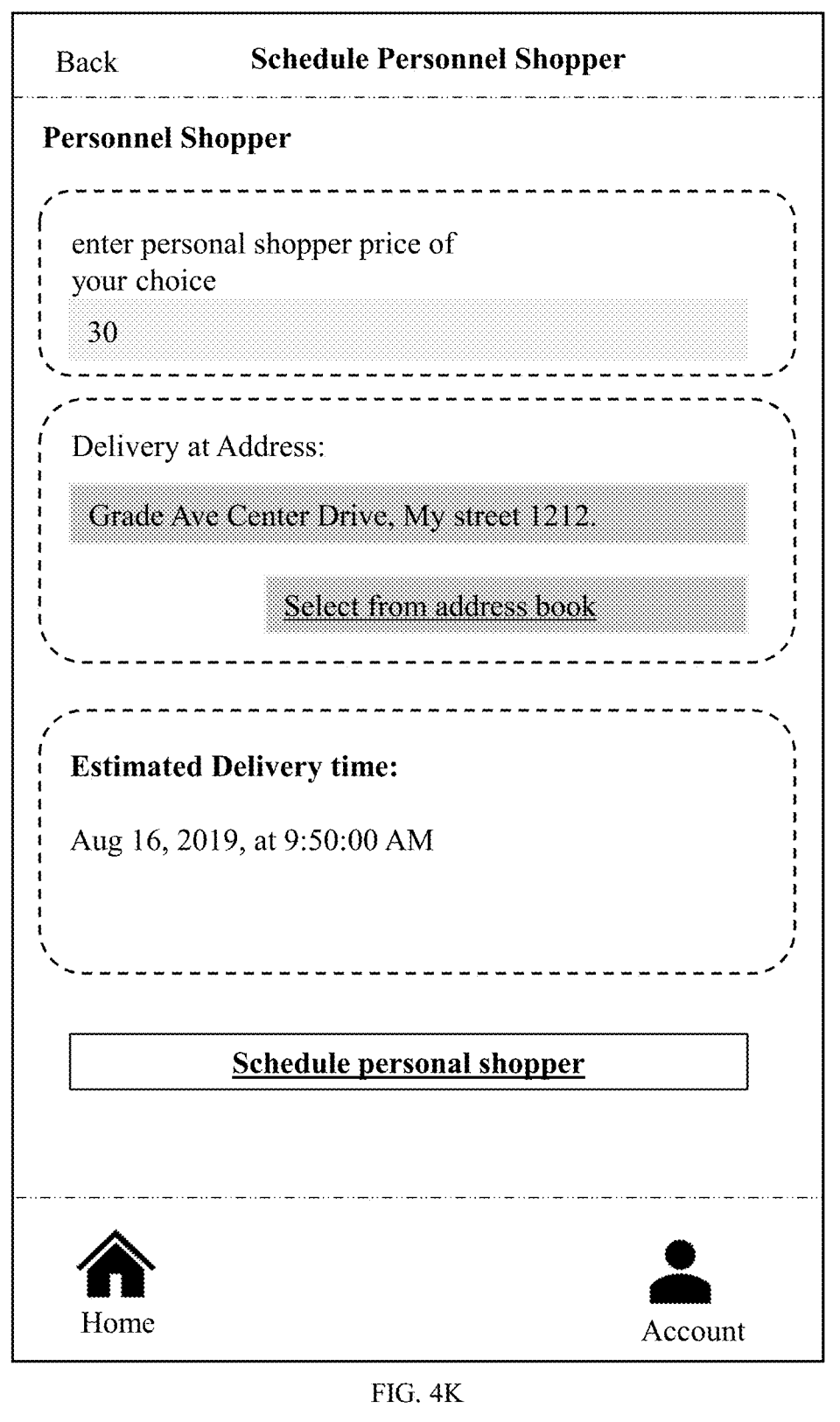
Figure 4L:

FIG. 4K is the graphical user interface screen of the mobile application for providing desired personal choice price, purchaser address, estimated delivery time and the like. Further, order details including product details and delivery details are shown to the purchaser. FIG. 4L is the graphical user interface screen of the mobile application depicting order placed page including order ID, delivery method, store address and the like.

Figure 5:
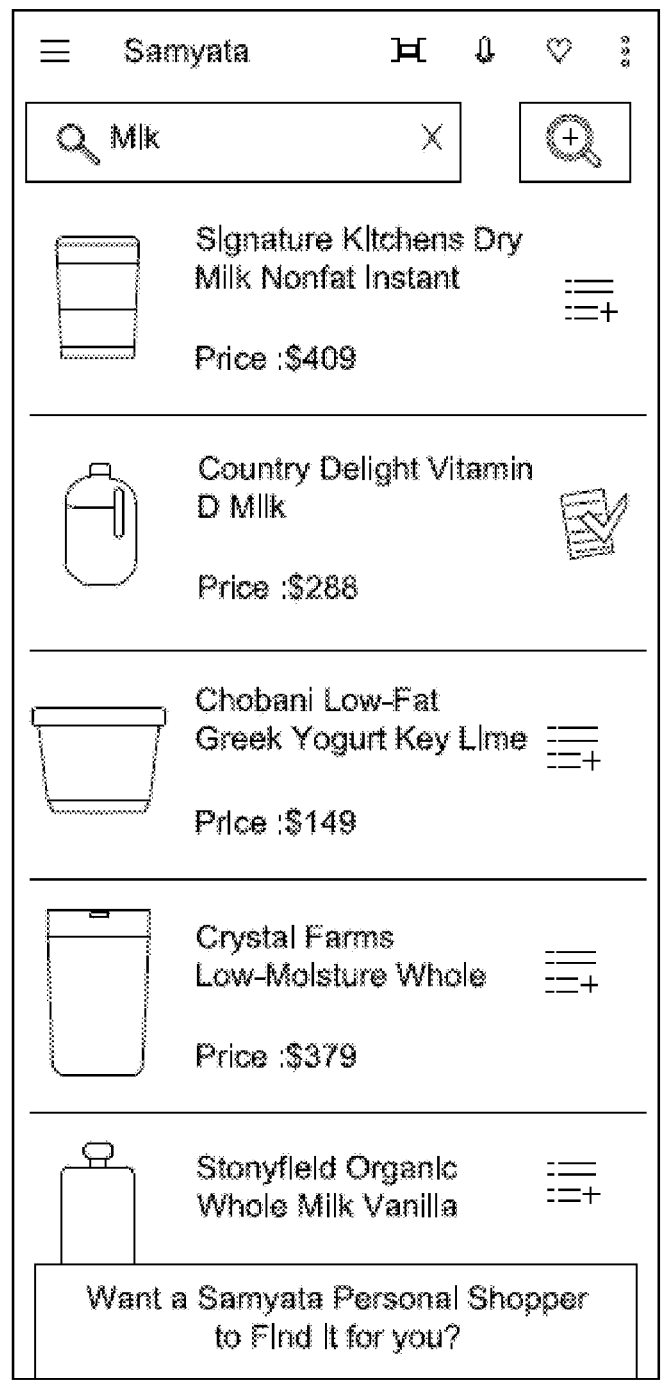
FIG. 5 is a graphical user interface screen of a mobile application capable of managing one or more shopping lists, in accordance with an embodiment of the present disclosure.

FIG. 5 is a graphical user interface screen of a mobile application capable of managing one or more shopping lists, in accordance with an embodiment of the present disclosure. In an embodiment of the present disclosure, the mobile application is used by the purchaser. FIG. 5 is the graphical user interface screen of the mobile application for adding and removing products from the one or more shopping lists. The purchaser search for a product in the search window. The search result may include exact product or similar products. In the current scenario, the purchaser searched for milk, as shown in FIG. 5. Further, the purchaser may tap on list icon to add the product into the one or more shopping list. When the purchaser taps on list icon, the list icon turns into tick icon. When the purchaser again taps on the tick icon, the product is removed from the one or more shopping lists and the tick icon turns into the list icon again. In the current scenario, the country delight vitamin D milk is added to the shopping list by tapping the list icon. When the purchaser long press on the product, the purchaser is directed to next page where the purchaser may add product specifications and add the product to a wish list. In an embodiment of the present disclosure, the one or more shopping lists are stored in the storage unit 206. The purchaser may add products in already created one or more shopping lists or the purchaser may also create a new shopping list. While creating the new shopping list, the purchaser is required to name it. In an embodiment of the present disclosure, a search bar is provided on top of the one or more shopping lists to search a product in the one or more shopping lists. The products in the one or more shopping lists are displayed in table view. In the table view, product image, product name and product price of each product in the one or more shopping lists is displayed on the graphical user interface screen. In an embodiment of the present disclosure, the swiping left on the product deletes the product from the one or more shopping lists.

In an alternate embodiment of the present disclosure, the purchaser may tap on "notepad" icon to add a product in the one or more shopping lists. When the purchaser taps on the "notepad" icon, the "notepad" icon turns dark in color. When the purchaser again taps on the dark "notepad" icon, the product is removed from the one or more shopping lists and the dark "notepad" icon turn into the notepad icon again. In the current scenario, the country delight vitamin D milk is added to the shopping list by tapping the notepad icon. In an embodiment of the present disclosure, the purchaser may access the one or more shopping lists by tapping on shopping list icon. Further, the purchaser may tap on "+" icon to create a new shopping list. When there are no shopping lists, the purchaser may be shown a message saying "we see that you haven't created a shopping list yet. Click here to start your new shopping list". If the purchaser desires to remove product from the shopping list, the purchaser has to swipe left and an option to delete the product may appear on the graphical user interface screen.

Figure 6C:
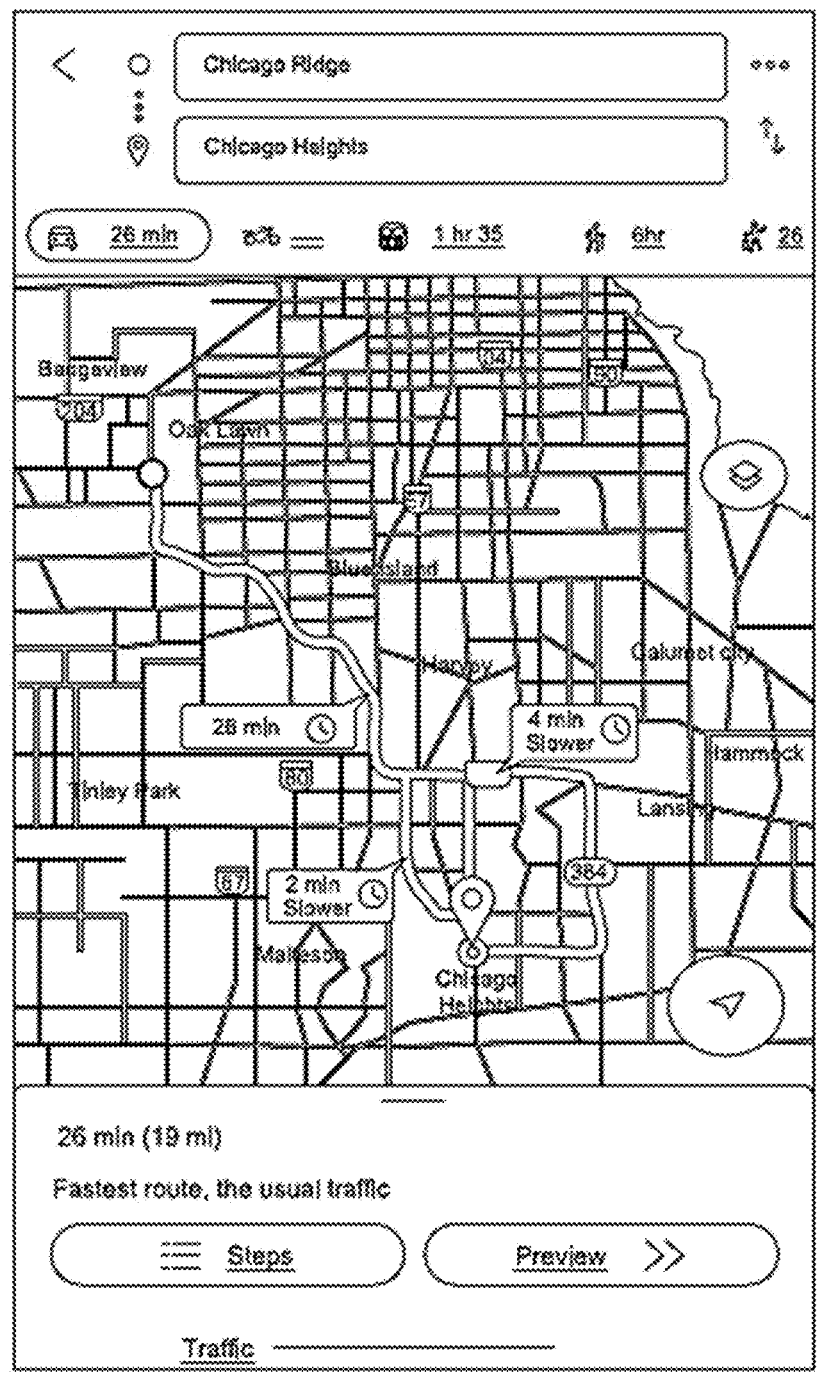

FIGS. 6A-C is a graphical user interface screen of a mobile application capable of facilitating delivery of the one or more products, in accordance with another embodiment of the present disclosure. In an embodiment of the present disclosure, the mobile application is used by the desired personal shopper. The desired personal shopper may tap on order ID under open orders tab to access order details page. FIG. 6A is the graphical user interface screen of the mobile application depicting the order details page. In the order details page, the desired personal shopper may view all the order details, such as store location, shopper location, date of delivery, time of delivery. By looking at all these details, the desired personal shopper may accept or reject the request. Personal shopper may also open map to check location of the purchaser. When the desired personal shopper accepts the request, new order falls under accepted order. FIG. 6B is the graphical user interface screen of the mobile application depicting order details including order ID, store location, purchaser location, date of delivery and the like. The purchaser may click on the map tab to view store direction. Personal Shopper should rate the store to reveal the QR code. When the desired personal shopper reaches the desired store to pick up the one or more products, the desired personal Shopper is required to rate the desired store to reveal the QR code and then Store Person may scan the QR code using the Scanner feature. In an embodiment of the present disclosure, the one or more products may be delivered only when the QR code of store person matches with the desired personal shopper. When the desired personal shopper picks the one or more products from the desired store, order will move from accepted orders to the picked-up orders. FIG. 6C is the graphical user interface screen of the mobile application showing map to view directions to the purchaser address. The desired personal shopper scans the QR code to deliver the product. QR code of desired personal shopper must exactly match with the purchaser's QR code. When the purchaser's and desired personal shopper's QR code matches, the one or more products are delivered to the purchaser and the order may fall from picked up order to the closed order. When the personal shopper refuses to deliver the one or more products, the request falls under declined orders. Further, when the purchaser chooses to return the one or more products and also selects a personal shopper to deliver the returns. The personal shopper receives return order notification and based on all the details, the personal shopper may choose to accept or decline the return order. When the personal Shopper accepts the return order, the return order falls under accepted order. Furthermore, the personal shopper clicks on the map to view direction to the store and the personal shopper may return the order by scanning the QR code. The one or more products are accepted by the store only when QR code of the personal shopper matches with the QR code of the store.

Thus, various embodiments of the present computing system 104 provide a solution to facilitate delivery of the one or more products. Since, the computing system 104 determines the best suitable personal shopper for delivering the one or more products to the purchaser, the computing system 104 provides provide a personalized shopping experience to the purchaser. Further, the computing system 104 generates the order schedule and the dynamic navigation map, such that the desired personal shopper may easily deliver the one or more products to the purchaser. The computing system 104 validates the security code for the personal shopper and the purchaser to enhance security. The computing system 104 also generates one or more recommendations for the personal shopper corresponding to rate of delivery the one or more products.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

I claim:

1. A computing system for facilitating delivery of one or more products, the computing system comprising:
   one or more hardware processors; and
   a memory coupled to the one or more hardware processors, wherein the memory comprises a plurality of modules in the form of programmable instructions executable by the one or more hardware processors, wherein the plurality of modules comprises:
   a data receiver module configured to:
   receive a request from a purchaser to purchase one or more products from a desired store, wherein the request comprises: types of the one or more products, quantity of the one or more products and a purchaser address, and wherein the request is received from the purchaser through at least one of: an Artificial Intelligence (AI)-based chatbot, a mobile application and a web browser; and
   receive a mode of delivery of the one or more products from the purchaser, wherein the mode of delivery comprises: pick-up, shipping at the desired store and a personal shopper;
   a store selection module configured to:
   sort one or more stores based on price of the one or more products, distance of the one or more stores, and stock of the one or more products, in proximity of the purchaser; and
   obtain an input from the purchaser corresponding to the sorted one or more stores based on one or more purchase parameters to determine the desired store from the one or more stores for purchasing the one or more products, wherein the one or more purchase parameters comprise:
   the price of the one or more products, offers associated with the one or more products, estimated delivery time of the one or more products, stock of the one or more products at each of the one or more stores and distance of each of the one or more stores from the purchaser address;
   a delivery management module configured to:
   determine the personal shopper for delivering the one or more products from the desired store to the purchaser based on the received request, received mode of delivery and predefined information by using a product delivery based Artificial Intelligence (AI) model upon receiving personal shopper as the model of delivery, wherein the received request is forwarded to the determined personal shopper; and
   determine one or more market makers for delivering the one or more products from the desired store to the purchaser based on the received request, the received mode of delivery and the predefined information by using the product delivery-based AI model upon obtaining a refusal from the personal shopper for the received request of the purchaser or unavailability of the personal shopper;
   a data obtaining module configured to obtain an approval from the personal shopper for the received request of the purchaser;
   a data generation module configured to:
   generate an order schedule for the received request based on the received request, received mode of delivery and predefined order schedule by using a product delivery-based AI model upon obtaining the approval from the personal shopper, wherein the order schedule comprises: purchaser address, desired store address information associated with the one or more products, estimated delivery time of the one or more products, and order number; and
   generate a dynamic navigation map for the personal shopper based on the received request upon generating the order schedule, wherein the dynamic navigation map comprises: a path flow from a source address to a destination address and wherein the source address is live location of the personal shopper and destination address is the purchaser address; and a data output module configured to output the generated order schedule and the generated dynamic navigation map on a graphical user interface of one or more purchaser devices associated with the purchaser and personal shopper device associated with the personal shopper.

2. The computing system of claim 1, further comprises a store selection module configured to:
  detect one or more stores in the proximity to the purchaser address having the one or more products based on the received request and prestored inventory details;
  determine the one or more purchase parameters associated with the one or more products corresponding to each of the detected one or more stores based on the received request, prestored inventory details and the predefined order schedule, wherein the one or more purchase parameters comprise: price of the one or more products, offers associated with the one or products, estimated delivery time of the one or more products, stock of the one or more products at each of the one or more stores and distance of each of the one or more stores from the purchaser address and wherein the detected one or more stores along with the determined one or more purchase parameters are outputted on the graphical user interface of the one or more purchaser devices associated with the purchaser; and
  receive an input from the purchaser corresponding to the outputted one or more stores and the outputted one or more purchase parameters to select the desired store from the one more stores for purchasing the one or more products.

3. The computing system of claim 2, wherein the store selection module is configured to:
  receive one or more shopping inputs from the purchaser to create one or more shopping lists, wherein the one or more inputs comprise: name of the one or more shopping lists, name of multiple products to be added in the one or more shopping lists, quantity of the multiple products and types of the multiple products;
  detect one or more stores in proximity to the purchaser address having one of: all of the multiple products and most of the multiple products based on the created one or more shopping lists and the prestored inventory details;
  determine the one or more purchase parameters associated with the one of: all of the multiple products and most of the multiple products corresponding to each of the detected one or more stores based on the one or more shopping lists, the prestored inventory details and the predefined order schedule, wherein the detected one or more stores along with the determined one or more purchase parameters are outputted on the graphical user interface of the one or more purchaser devices associated with the purchaser;
  receive an input from the purchaser corresponding to the outputted one or more stores and the outputted one or more purchase parameters to select the desired store from the one more stores for purchasing the one of: all of the multiple products and most of the multiple products;
  detect one or more stores in proximity to the purchaser address having remaining products of the one or more shopping lists based on the created one or more shopping lists and the prestored inventory details upon detecting most of the multiple products;
  determine the one or more purchase parameters associated with the remaining products corresponding to each of the detected one or more stores based on the one or more shopping lists, the prestored inventory details and the predefined order schedule, wherein the detected one or more stores along with the determined one or more purchase parameters are outputted on the graphical user interface of the one or more purchaser devices associated with the purchaser; and
  receive an input from the purchaser corresponding to the outputted one or more stores and the outputted one or more purchase parameters to select the desired store from the one more stores for purchasing the remaining products.

4. The computing system of claim 1, wherein in determining the personal shopper for delivering the one or more products from the desired store to the purchaser based on the received request, the received mode of delivery and the predefined information by using the product delivery-based AI model upon receiving personal shopper as the model of delivery, the delivery management module is configured to:
  determine one or more personal shoppers for delivering the one or more products by correlating the received request, the received mode of delivery and the predefined information using the product delivery-based AI model, wherein the determined one or more personal shoppers are outputted on the graphical user interface of the one or more purchaser devices associated with the purchaser; and
  receive an input from the purchaser corresponding to the outputted one or more personal shoppers to select best suitable personal shopper from the determined one or more personal shoppers for delivering the one or more products.

5. The computing system of claim 1, wherein the predefined information comprise: one or more order parameters received from the purchaser, one or more delivery parameters received from the personal shopper and list of available personal shoppers, wherein the one or more order parameters comprise: past preferences, feedbacks, price range for the personal shopper, desired time of delivery and desired proximity range of the personal shopper from the desired store and wherein the one or more delivery parameters comprise: rates of delivering products fixed by the personal shopper based on distance, weight, value of purchase, rating of the purchaser and purchaser address, delivery range of the personal shopper, time required to deliver the products, working hours of the personal shopper and stores for which the personal shopper is willing to deliver.

6. The computing system of claim 1, further comprises a data validation module configured to:
  generate a security code corresponding to the order schedule for both the purchaser and the personal shopper;
  validate the security code for the personal shopper during picking-up the one or more products from the desired store based on prestored personal shopper details; and
  validate the security code for the purchaser during delivering the one or more products at the purchaser address based on prestored purchaser details.

7. The computing system of claim 6, wherein the data receiver module is configured to receive a delivery confirmation message from the personal shopper upon delivery of the one or more products to the purchaser based on at least one of: the generated dynamic navigation map and validation of the security code associated with the purchaser.

8. The computing system of claim 1, further comprises a charity management module configured to:
  receive charity information from at least one of: the desired store and the purchaser for making donations to a desired charity from one or more predefined charities, wherein the charity information comprises: one or more purchaser parameters received from the purchaser and one or more store parameters received from the desired store, wherein the one or more purchaser parameters comprise: name of the charity and amount to be donated to charity and wherein the one or more store parameters comprise:

name of the desired charity, custom percentage of revenue to be donated and time-frame for donation; and determine one or more analysis parameters for the desired charity based on the received charity information, wherein the determined one or more analysis parameters comprise: trends, demographics and the amount received from the purchaser and the desired store and wherein the determined one or more analysis parameters are outputted on a graphical user interface of charity device associated with the desired charity.

9. The computing system of claim 1, further comprises a recommendation module configured to generate one or more recommendations for the personal shopper corresponding to rate of delivery the one or more products based on the received request, received mode of delivery and predefined information by using the product delivery-based AI model, wherein the generated one or more recommendations are outputted on the graphical user interface of the personal shopper device.

10. A method for facilitating delivery of one or more products, the method comprising:

receiving, by one or more hardware processors, a request from a purchaser to purchase one or more products from a desired store, wherein the request comprises:

types of the one or more products, quantity of the one or more products and a purchaser address, and wherein the request is received from the purchaser through at least one of:

an Artificial Intelligence (AI)-based chatbot, a mobile application and a web browser;

receiving, by the one or more hardware processors, a mode of delivery of the one or more products from the purchaser, wherein the mode of delivery comprises: pick-up, 4shipping at the desired store and a personal shopper;

sorting, by the one or more hardware processors, one or more stores based on price of the one or more products, distance of the one or more stores, and stock of the one or more products, in proximity of the purchaser;

obtaining, by the one or more hardware processors, an input from the purchaser corresponding to the sorted one or more stores based on one or more purchase parameters to determine the desired store from the one more stores for purchasing the one or more products, wherein the one or more purchase parameters comprise: the price of the one or more products, offers associated with the one or more products, estimated delivery time of the one or more products, stock of the one or more products at each of the one or more stores and distance of each of the one or more stores from the purchaser address;

determining, by the one or more hardware processors, the personal shopper for delivering the one or more products from the desired store to the purchaser based on the received request, received mode of delivery and predefined information by using a product delivery based Artificial Intelligence (AI) model upon receiving personal shopper as the model of delivery, wherein the received request is forwarded to the determined personal shopper;

determining, by the one or more hardware processors, one or more market makers for delivering the one or more products from the desired store to the purchaser based on the received request, the received mode of delivery and the predefined information by using the product delivery-based AI model upon obtaining a refusal from the personal shopper for the received request of the purchaser or unavailability of the personal shopper;

selecting, by the one or more hardware processors, the desired store from one more stores for purchasing the one or more products based on one or more purchase parameters;

obtaining, by the one or more hardware processors, an approval from the personal shopper for the received request of the purchaser;

generating, by the one or more hardware processors, an order schedule for the received request based on the received request, received mode of delivery and predefined order schedule by using a product delivery-based AI model upon obtaining the approval from the personal shopper, wherein the order schedule comprises:

purchaser address, desired store address information associated with the one or more products, estimated delivery time of the one or more products and order number;

generating, by the one or more hardware processors, a dynamic navigation map for the personal shopper based on the received request upon generating the order schedule, wherein the dynamic navigation map comprises: a path flow from a source address to a destination address and wherein the source address is live location of the personal shopper and destination address is the purchaser address; and outputting, by the one or more hardware processors, the generated order schedule and the generated dynamic navigation map on a graphical user interface of one or more purchaser devices associated with the purchaser and personal shopper device associated with the personal shopper.

11. The method of claim 10, further comprises:

detecting one or more stores in the proximity to the purchaser address having the one or more products based on the received request and prestored inventory details;

determining the one or more purchase parameters associated with the one or more products corresponding to each of the detected one or more stores based on the received request, prestored inventory details and the predefined order schedule, wherein the one or more purchase parameters comprise: price of the one or more products, offers associated with the one or products, estimated delivery time of the one or more products, stock of the one or more products at each of the one or more stores and distance of each of the one or more stores from the purchaser address and wherein the detected one or more stores along with the determined one or more purchase parameters are outputted on the graphical user interface of the one or more purchaser devices associated with the purchaser; and receiving an input from the purchaser corresponding to the outputted one or more stores and the outputted one or more purchase parameters to select the desired store from the one more stores for purchasing the one or more products.

12. The method of claim 11, further comprises:
receiving one or more shopping inputs from the purchaser to create one or more shopping lists, wherein the one or more inputs comprise: name of the one or more shopping lists, name of multiple products to be added in the one or more shopping lists, quantity of the multiple products and types of the multiple products;
detecting one or more stores in proximity to the purchaser address having one of: all of the multiple products and most of the multiple products based on the created one or more shopping lists and the prestored inventory details;
determining the one or more purchase parameters associated with the one of: all of the multiple products and most of the multiple products corresponding to each of the detected one or more stores based on the one or more shopping lists, the prestored inventory details and the predefined order schedule, wherein the detected one or more stores along with the determined one or more purchase parameters are outputted on the graphical user interface of the one or more purchaser devices associated with the purchaser;
receiving an input from the purchaser corresponding to the outputted one or more stores and the outputted one or more purchase parameters to select the desired store from the one more stores for purchasing the one of: all of the multiple products and most of the multiple products;
detecting one or more stores in proximity to the purchaser address having remaining products of the one or more shopping lists based on the created one or more shopping lists and the prestored inventory details upon detecting most of the multiple products;
determining the one or more purchase parameters associated with the remaining products corresponding to each of the detected one or more stores based on the one or more shopping lists, the prestored inventory details and the predefined order schedule, wherein the detected one or more stores along with the determined one or more purchase parameters are outputted on the graphical user interface of the one or more purchaser devices associated with the purchaser; and
receiving an input from the purchaser corresponding to the outputted one or more stores and the outputted one or more purchase parameters to select the desired store from the one more stores for purchasing the remaining products.

13. The method of claim 10, wherein determining the personal shopper for delivering the one or more products from the desired store to the purchaser based on the received request, the received mode of delivery and the predefined information by using the product delivery-based AI model upon receiving personal shopper as the model of delivery comprises:
determining one or more personal shoppers for delivering the one or more products by correlating the received request, the received mode of delivery and the predefined information using the product delivery-based AI model, wherein the determined one or more personal shoppers are outputted on the graphical user interface of the one or more purchaser devices associated with the purchaser; and
receiving an input from the purchaser corresponding to the outputted one or more personal shoppers to select best suitable personal shopper from the determined one or more personal shoppers for delivering the one or more products.

14. The method of claim 10, wherein the predefined information comprise: one or more order parameters received from the purchaser, one or more delivery parameters received from the personal shopper and list of available personal shoppers, wherein the one or more order parameters comprise: past preferences, feedbacks, price range for the personal shopper, desired time of delivery and desired proximity range of the personal shopper from the desired store and wherein the one or more delivery parameters comprise: rates of delivering products fixed by the personal shopper based on distance, weight, value of purchase, rating of the purchaser and purchaser address, delivery range of the personal shopper, time required to deliver the products, working hours of the personal shopper and stores for which the personal shopper is willing to deliver.

15. The method of claim 10, further comprises:
generating a security code corresponding to the order schedule for both the purchaser and the personal shopper;
validating the security code for the personal shopper during picking-up the one or more products from the desired store based on prestored personal shopper details; and
validating the security code for the purchaser during delivering the one or more products at the purchaser address based on prestored purchaser details.

16. The method of claim 15, further comprises receiving a delivery confirmation message from the personal shopper upon delivery of the one or more products to the purchaser based on at least one of: the generated dynamic navigation map and validation of the security code associated with the purchaser.

17. The method of claim 10, further comprises:
receiving charity information from at least one of: the desired store and the purchaser for making donations to a desired charity from one or more predefined charities, wherein the charity information comprises: one or more purchaser parameters received from the purchaser and one or more store parameters received from the desired store, wherein the one or more purchaser parameters comprise: name of the charity and amount to be donated to charity and wherein the one or more store parameters comprise:
name of the desired charity, custom percentage of revenue to be donated and time-frame for donation; and
determining one or more analysis parameters for the desired charity based on the received charity information, wherein the determined one or more analysis parameters comprise: trends, demographics and the amount received from the purchaser and the desired store and wherein the determined one or more analysis parameters are outputted on a graphical user interface of charity device associated with the desired charity.

18. The method of claim 10, further comprises generating one or more recommendations for the personal shopper corresponding to rate of delivery the one or more products based on the received request, received mode of delivery and predefined information by using the product delivery-based AI model, wherein the generated one or more recommendations are outputted on the graphical user interface of the personal shopper device.

* * * * *